United States Patent
Schwartz et al.

(10) Patent No.: US 9,743,753 B2
(45) Date of Patent: *Aug. 29, 2017

(54) LAUNDRY TRANSFER APPARATUS

(71) Applicant: EZ LOAD LLC, Lynbrook, NY (US)

(72) Inventors: David Schwartz, Woodmere, NY (US); Robert Rahmanzada, Valley Stream, NY (US)

(73) Assignee: EZ Load LLC, Lynbrook, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/344,987

(22) Filed: Nov. 7, 2016

(65) Prior Publication Data

US 2017/0051450 A1  Feb. 23, 2017

Related U.S. Application Data

(63) Continuation-in-part of application No. 14/950,336, filed on Nov. 24, 2015, now Pat. No. 9,516,943, which is a continuation of application No. 14/299,558, filed on Jun. 9, 2014, now Pat. No. 9,222,215.

(51) Int. Cl.
*A47B 5/04* (2006.01)
*D06F 95/00* (2006.01)
*B65G 11/18* (2006.01)
*B65G 11/02* (2006.01)

(52) U.S. Cl.
CPC .............. *A47B 5/04* (2013.01); *B65G 11/023* (2013.01); *B65G 11/183* (2013.01); *D06F 95/00* (2013.01); *D06F 95/002* (2013.01)

(58) Field of Classification Search
CPC ................................. A47B 5/04; B65G 11/183
See application file for complete search history.

(56) References Cited

U.S. PATENT DOCUMENTS

| | | | | |
|---|---|---|---|---|
| 2,685,441 | A * | 8/1954 | Baade | D06F 95/002 177/126 |
| 5,411,164 | A * | 5/1995 | Smith | A47B 77/02 312/290 |
| 8,763,537 | B2 * | 7/2014 | Ng | A47B 5/006 108/35 |
| 8,910,857 | B1 * | 12/2014 | Hegarty | D06F 95/002 232/1 B |
| 2010/0064543 | A1 * | 3/2010 | Helot | D06F 39/12 34/201 |

(Continued)

*Primary Examiner* — Thomas Randazzo
(74) *Attorney, Agent, or Firm* — Stern & Schurin LLP

(57) ABSTRACT

A laundry transfer apparatus comprising a wire frame within which is disposed a transfer conduit or shelf assembly that traverses a distance between the openings of a washing machine and dryer. A plurality of support wings and bumpers with friction pads are provided to enable the apparatus to rest on the top surfaces of a washing machine and dryer and to vertically suspend the apparatus so that the shelf assembly is appropriately positioned for each use. The conduit or shelf assembly preferably comprises a substantially planar surface composed of table sections that fold outward when the laundry transfer apparatus is in use. The shelf assembly is slidably engaged to the frame via sliding assembly. When use of the laundry transfer apparatus is complete, the individual sections are folded upright and pushed into a retracted position for later use.

20 Claims, 21 Drawing Sheets

(56) References Cited

U.S. PATENT DOCUMENTS

2011/0226641 A1* 9/2011 Vensel ................ A45C 7/0036
              206/278
2013/0319815 A1* 12/2013 Kennedy ............. B65G 11/023
              193/32
2015/0030261 A1* 1/2015 Mahjoubi ............ D06F 95/004
              383/13
2015/0354129 A1* 12/2015 Schwartz ............. D06F 95/00
              193/2 R

* cited by examiner

LAUNDRY TRANSFER APPARATUS

RELATED APPLICATIONS

This application is a continuation-in-part of U.S. application Ser. No. 14/950,336, filed on Nov. 24, 2015 and now allowed, which is a continuation of U.S. application Ser. No. 14/299,558, filed on Jun. 9, 2014 and now issued as U.S. Pat. No. 9,222,215. Both U.S. application Ser. No. 14/950,336 and U.S. application Ser. No. 14/299,558 are incorporated herein by reference.

FIELD OF INVENTION

The present invention relates generally to the field of laundry. More specifically, the invention involves a laundry support device that eases the task of laundering clothing. More specifically, the invention relates to a laundry transfer aid for use in connection with relocating laundry between a conventional washing machine and a dryer.

BACKGROUND OF THE INVENTION

The process of transferring laundry from a washing machine to a dryer is frequently unwieldy and cumbersome. In particular, after a washing cycle is complete, wet clothing in a washing machine is often tangled together (typically caused by washing machine spin cycle) leaving a user with a scrambled muddle of clothing that is difficult to handle. When a user aims to transfer wet clothing out of the washing machine and into a dryer, a user typically attempts to grab an entire mound of clothing from the washing machine, hoping to capture every last article. Unfortunately, while most of a load may be successfully transferred into the dryer in a single attempt, a user often finds some pieces of clothing on the floor. This course of events generally requires a user to pick up clothes from the floor, inspect them to determine whether the clothes are sullied and then either place them into the dryer with the clothes that were successfully transferred or re-wash the clothes if they became dirty from making contact with the floor during an unsuccessful transfer to the dryer.

The prior art discloses mechanisms used in connection with the transfer of laundry. However, most are generally inapplicable to laundry operations that utilize a separate washing machine and a separate dryer machine. The prior art also focuses predominantly on commercial laundry transfer operations and mechanisms that are inapplicable to and inappropriate for use with household washing machines and drying machines.

For example, U.S. Pat. No. 5,662,186 covers a commercial shuttle hopper system for loading and unloading commercial washing machines. The system comprises a bucket to receive laundry and includes lift and tilt assemblies to dump the buckets and discharge the laundry into a washer or dryer.

Chinese Patent 202967440 covers a commercial linen conveyor device having shuttle wheels and a drive mechanism that are placed on a support frame with a conveyor belt. The device allows mechanical automatic transfer of linen between a washing machine and the dryer, and eliminates the need for manual transfer.

U.S. Pat. No. 7,404,303 and U.S. Pat. No. 6,978,556 both teach combination washing machines and dryers that allow clothing to drop from a washing machine through a hole positioned beneath the washing machine into a dryer. After the washing machine finishes the cycle, the laundry is automatically transferred by falling to the dryer.

Accordingly, despite the respective benefits of the foregoing prior art systems, there remains a need for a laundry transfer apparatus that eases the task of laundering clothing in connection with household laundry machines.

SUMMARY OF THE INVENTION

In view of the limitations and drawbacks in the prior art, it is a primary object of the present invention to provide a laundry transfer apparatus for use in connection with relocating laundry between a conventional household washing machine and a dryer.

It is another object of the present invention to provide a laundry transfer apparatus that minimizes the incidence of clothing becoming soiled between washing and drying operations.

It is a further object of the present invention to provide a laundry transfer apparatus that also functions as a folding table between a washing machine and dryer.

It is yet another object of the present invention to provide a laundry transfer apparatus that can be used in connection with both side loader and top loader washing machines and dryers.

Another object of the present invention is to provide a laundry transfer apparatus that fits and folds away neatly between a washing machine and a dryer, thereby minimizing the spatial requirements for the apparatus.

Additional objectives will be apparent from the description of the invention that follows.

In summary, there is provided in a preferred embodiment of the present invention a laundry transfer apparatus comprising a rigid frame that forms a wire casing or exterior sleeve within which there is disposed a shelf assembly that traverses a distance between the openings of a washing machine and dryer. The apparatus further comprises a plurality of support wings that rest on the top surfaces of the washing machine and dryer, respectively, and sized to help the apparatus straddle the space therebetween. The shelf assembly comprises a pair of substantially planar table surfaces with perimeter walls. The shelf assembly is attached to an extending and retracting sliding assembly (via a railing or other conventional sliding mechanism) that enables the shelf assembly to extend and retract into the wire casing when the laundry transfer apparatus is in use. Laundry transfer apparatus further includes a pair of folding support legs that telescopically extend downward and that support the shelf assembly when in an open position during use. When the use of the laundry transfer apparatus is complete, the individual table sections are folded upright and pushed inside the wire casing for safe storage.

Additional features of the laundry transfer apparatus are described below in more detail.

BRIEF DESCRIPTIONS OF THE DRAWINGS

The above-described and other advantages and features of the present disclosure will be appreciated and understood by those skilled in the art from the following detailed description and drawings of which FIG. 1 is a perspective view of a preferred embodiment of the laundry transfer apparatus of the present invention, in a closed or retracted position;

Figure 23:
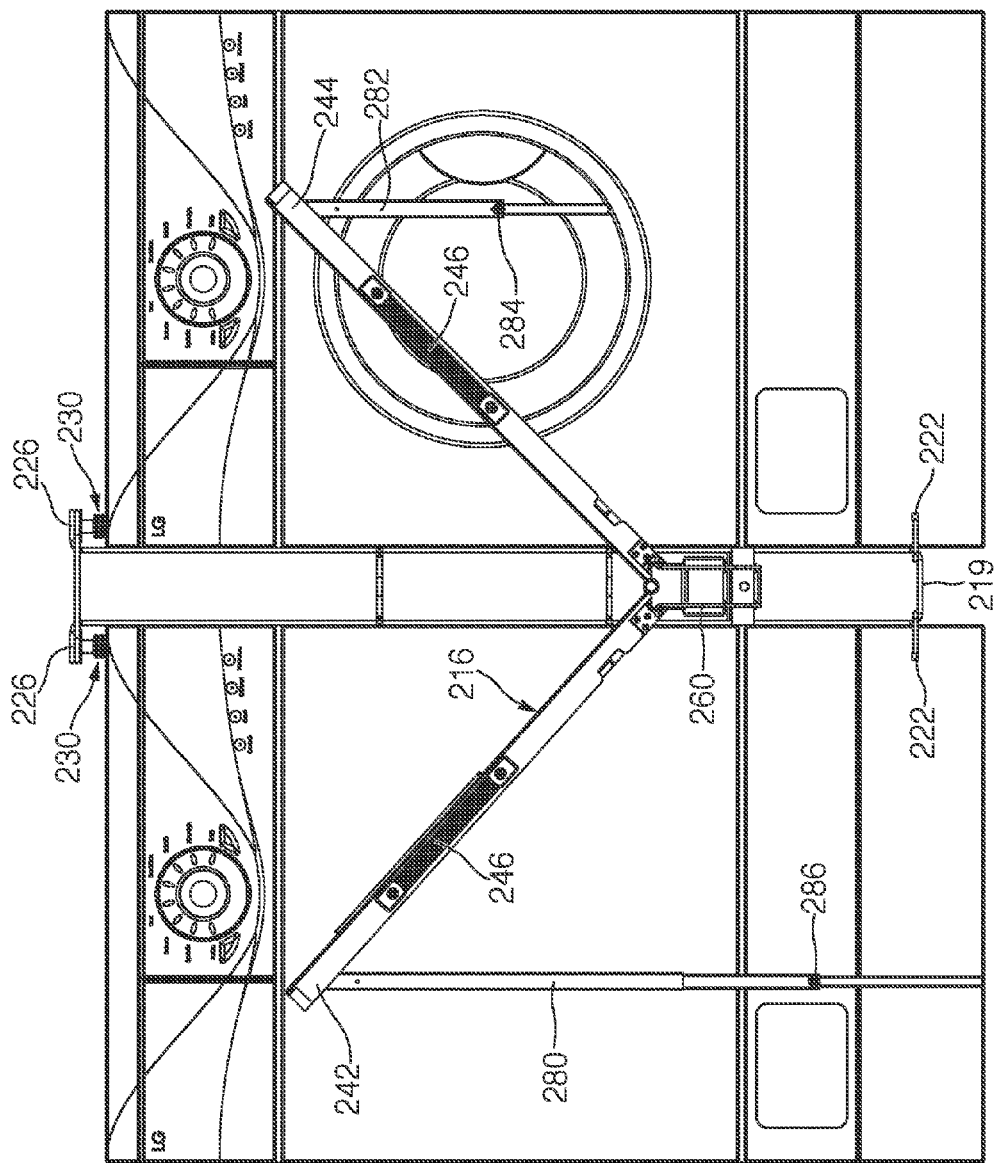
Figure 24:
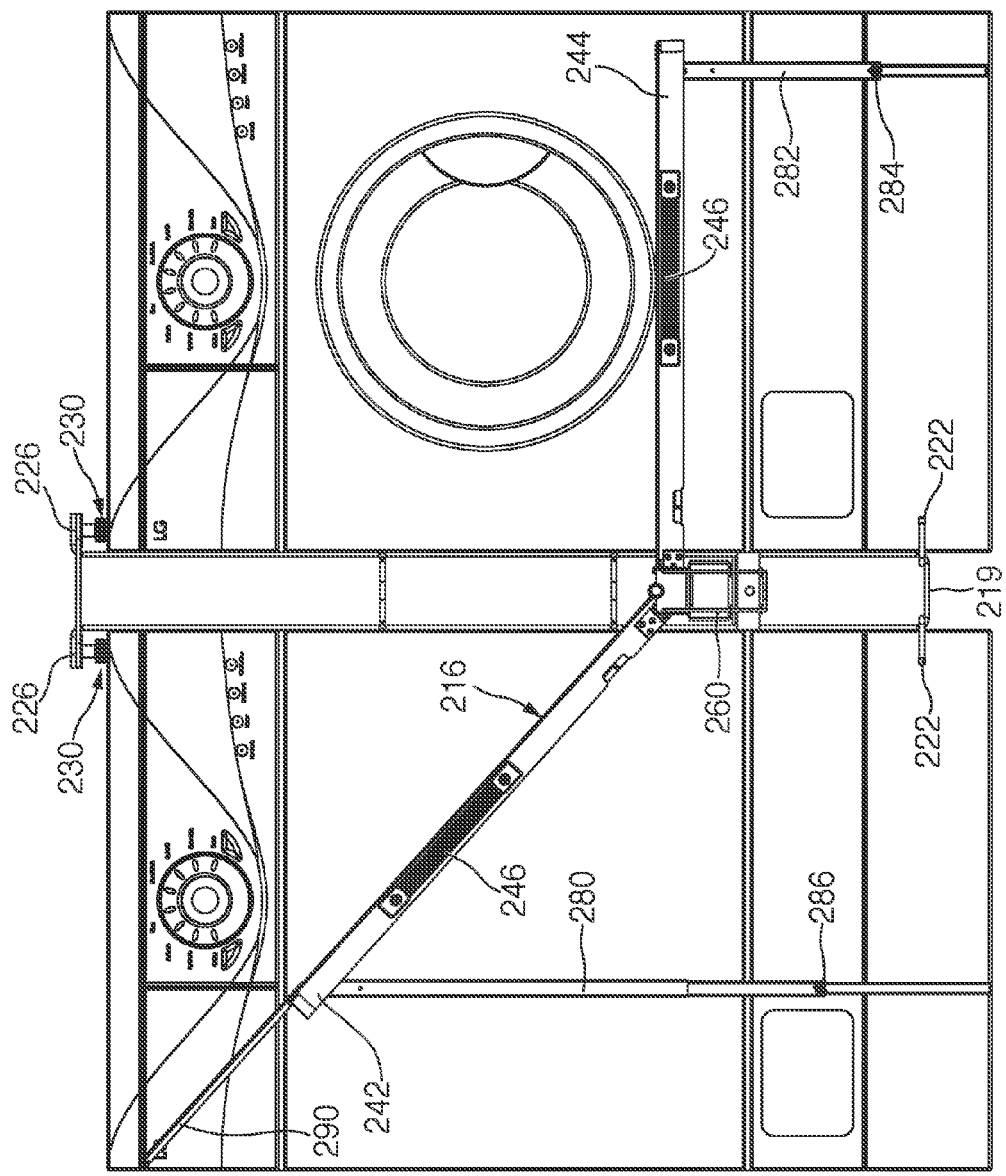

FIG. 23 is a front elevational view thereof vertically suspended between a top loader washing machine and a side loader dryer with the sliding support member or sliding assembly in an extended position and the conduit or shelf assembly in a partially open position; and FIG. 24 is a front elevational view thereof vertically suspended between a top loader washing machine and a side loader dryer with the sliding support member, spine or sliding assembly in an extended position, the conduit or shelf assembly in a fully open position and the pivoting conduit extension in an unfolded position.

DETAILED DESCRIPTION OF THE INVENTION

Figure 1:
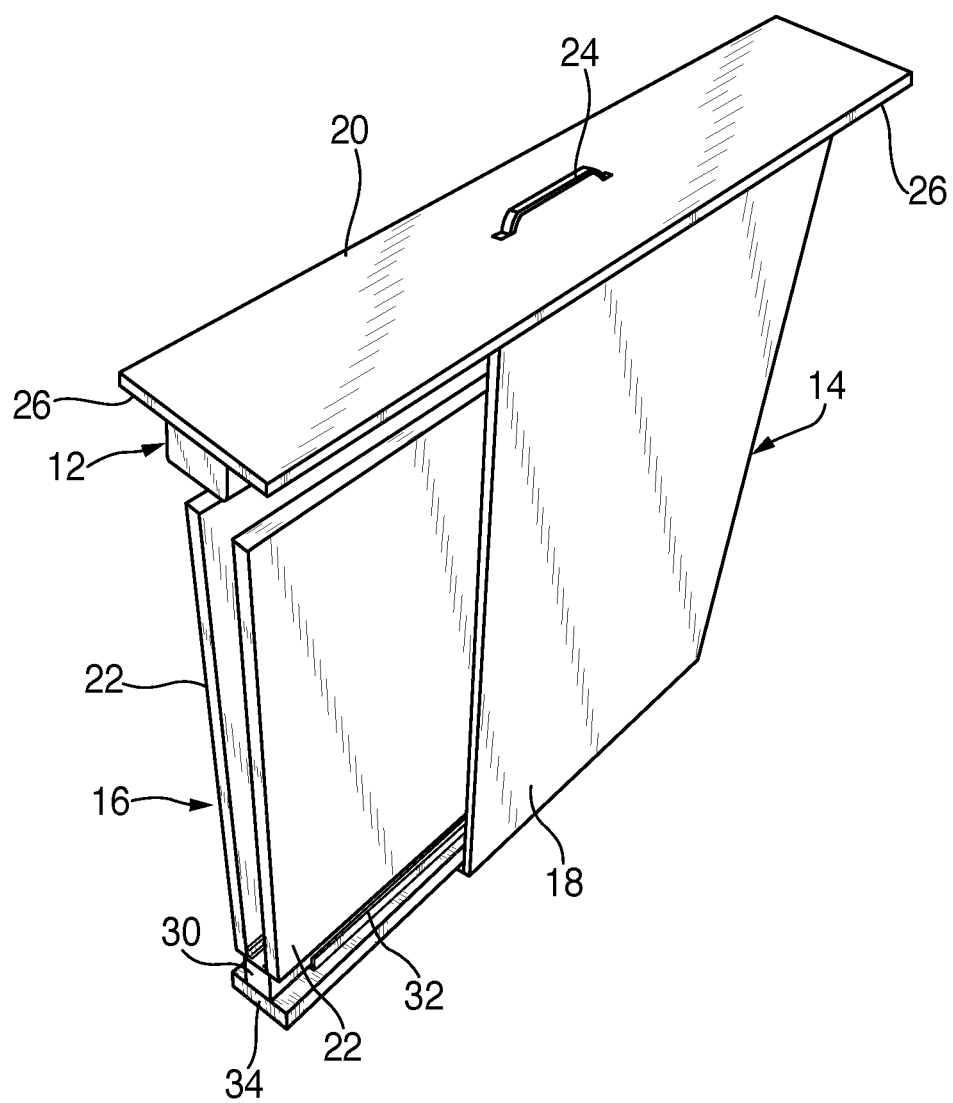

With reference to FIG. 1, FIG. 2, FIG. 6, FIG. 7 and FIG. 8 there is shown a preferred embodiment of the laundry transfer apparatus 10. As shown in FIG. 1, the apparatus 10 comprises a generally rigid frame 12 that forms an exterior casing 14 within which a transfer bridge or conduit 16 is located in a closed and retracted position. The casing 14 comprises lateral walls or partitions 18, a cover 20 and bottom or base 34. A back (not shown) may be provided as well.

Partitions 18 are positioned on either side of the exterior casing 14 and are intended to separate transfer conduit 16 from the sides of the washing machine and dryer between which the apparatus 10 is positioned. Partitions 18 also facilitate the conduit so that it may remain in an upwardly folded and closed position when apparatus 10 is not in use. As shown in FIG. 1, it should be appreciated that partitions 18 are not required to extend fully forward, and thus, conduit 16 may at least partially extend forward beyond the edge of partitions 18, even when conduit 16 is in a fully retracted position.

In a preferred embodiment, partitions 18 are formed of a hard or flexible solid wall to keep dust and dirt from entering the interior of apparatus. However, it should be appreciated and understood that partitions 18 may also be formed utilizing a substantially transparent screen, lattice grating or similar support structure through which the interior of said casing is visible. Partitions may be formed with up to approximately 90% of open surface area in said support structure, if desired. A support structure open surface area is defined as the percent (%) area that is not blocked by the structural members comprising the support structure. Partitions may also be formed utilizing a wire casing in accordance with the embodiments illustrated in FIGS. 11 through 24 while still keeping within the spirit and scope of the invention.

Figure 6:
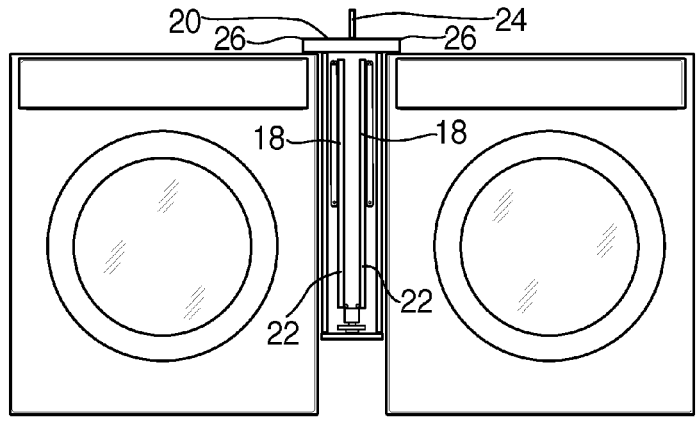
FIG. 6 is a front elevational view of a laundry transfer apparatus in a retracted position vertically suspended between a side loader washing machine and dryer.
Figure 7:
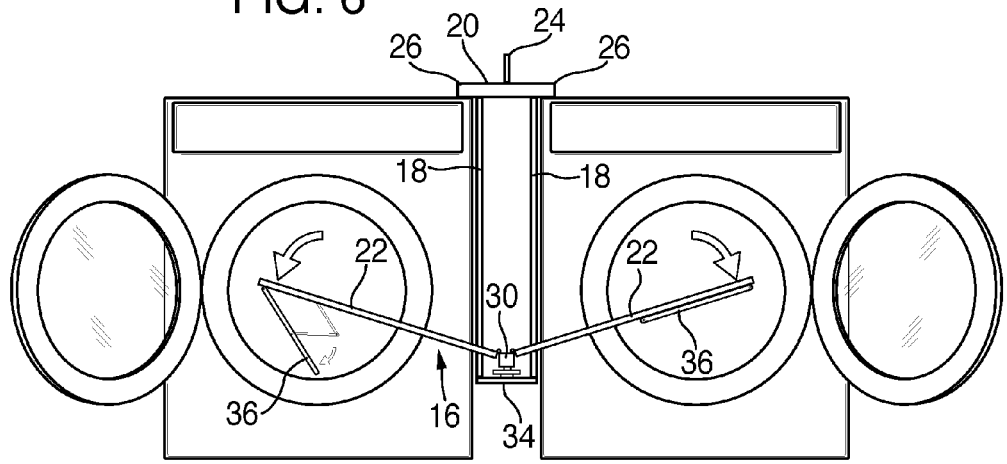
FIG. 7 is a front elevational view of the laundry transfer apparatus in a partially extended position, with the individual sections forming the conduit being unfolded along with the conduit support legs.
Figure 8:
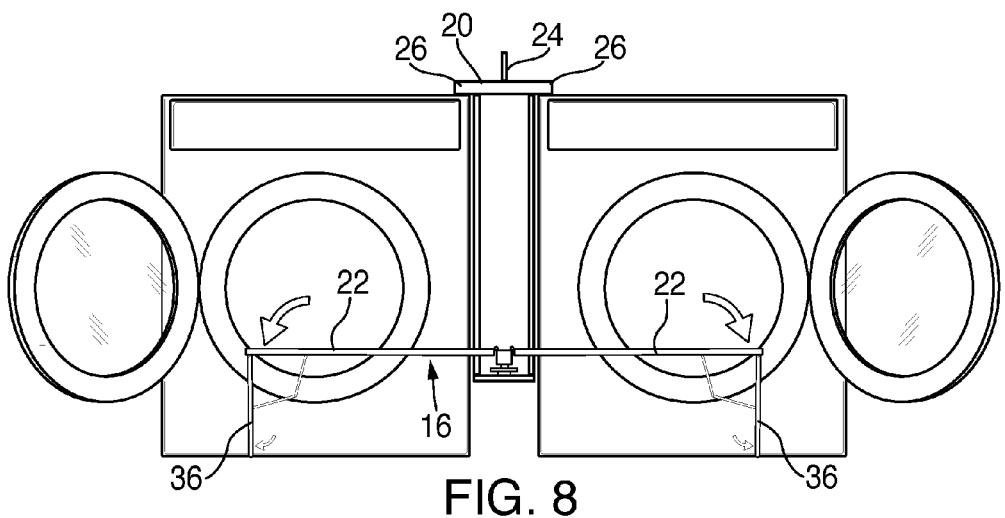
FIG. 8 is a front elevational view of the laundry transfer apparatus in a fully extended position.

In a preferred embodiment, cover 20 is connected to partitions 18 and comprises a handle 24 for carrying apparatus 10 during transport or cleaning thereof. In a preferred embodiment, as best depicted in FIGS. 6 through 8, cover 20 further comprises a pair of upper extensions, wings or support ledges 26 that rest upon the top surfaces of a washing machine and dryer positioned on either side of apparatus 10. Support ledges 26 thus extend laterally beyond partitions 18 and enable partitions 18 to serve as a boundary guard to prevent contact with the interior of casing 14 and transfer conduit 16. Support ledges 26 vertically suspend apparatus 10 at an ideal height enabling conduit 16 to extend into an open, unfolded position at the mouth of a side loading washing machine and side loading dryer. Although extensions, wings or support ledges 26 are shown in a preferred embodiment to be integrally formed with cover 20, it should be appreciated and understood that extensions, wings or support ledges may be incorporated and attached as part of apparatus 10, but separate from cover 20. For example, one or more extensions may be appended at a given height along partition 18 to vertically suspend apparatus 10.

Transfer conduit 16 is comprised of individual, substantially planar table sections 22 that are each attached to a first spine or sliding support member 30. In a preferred embodiment, transfer bridge or conduit 16 and its substantially planar sections 22 are attached by hinged connectors 28 to sliding support member 30. Sliding support member 30 is slidably engaged to frame 12 and casing 14 via conventional sliding rail 32, typically utilized in sliding drawers and the like. As shown in FIG. 1, sliding rail 32 is positioned between sliding support member 30 and base 34 that is also slidably connected to frame 12, thus providing for multiple railing extensions which together may bear the weight of the extended transfer conduit 16 (with and without clothing). In an alternate preferred embodiment, a base 34 may be rendered immobile by fixedly fastening it to partitions 18, as depicted, for example, in FIG. 7. In such an embodiment, an intermediate sliding support and railing may be placed between sliding support member 30 and base 34, if additional extension members are desired beyond the length provided in connection with sliding support member 30. In a further alternate embodiment, sliding rails may be provided on the interior side of partitions, and sliding support member 30 (or intermediate sliding supports) may be slidably engaged to the partitions utilizing sliding rails.

Figure 2:
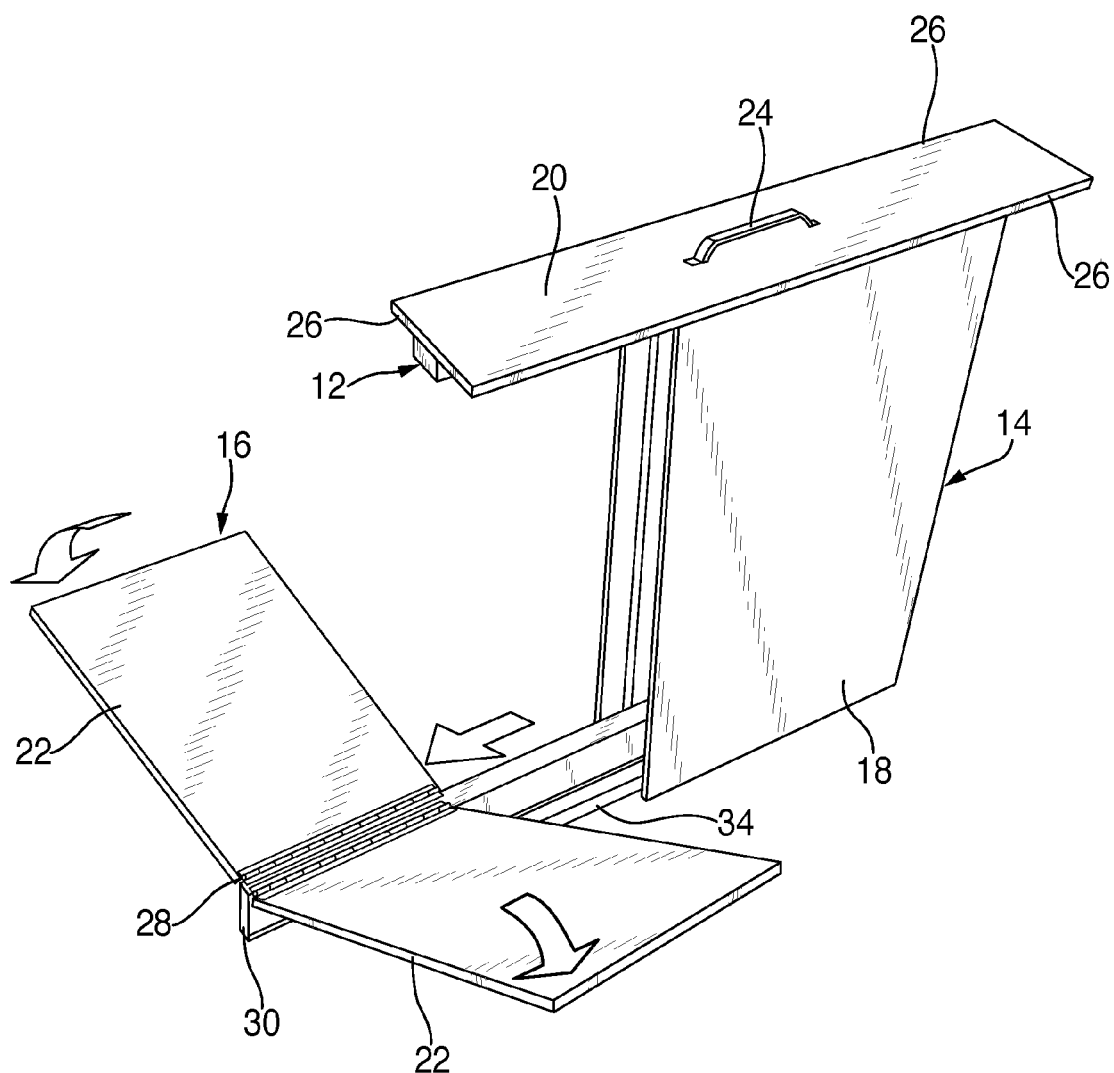
FIG. 2 is a perspective view of the laundry transfer apparatus with the sliding support member or spine in an extended position and the conduit in a partially open position.

An alternate configuration for shifting the transfer conduit from a retracted position to an extended position is to provide a pivot point or pin (in the central rear vicinity of the transfer conduit) around which the transfer conduit may rotate forward 90 degrees into position substantially similar to that shown in FIG. 2. After use is complete, the table sections of the transfer conduit are folded back into place and the entire conduit with its table sections is rotated in the reverse 90 degrees, rearward into a retracted position.

As shown in FIG. 2 and FIG. 7, when apparatus 10 is in use, transfer conduit 16 is pulled from its retracted position into an extended position outside frame 12, forward of the face of washing machine and dryer. After transfer conduit 16 extends forward, table sections 22 pivot down and outward from their upright folded positions. A latch and chain may be provided to prevent table sections 22 from falling outward automatically and away from one another once they clear the front of the washing machine and dryer. Alternatively, to prevent a sudden unfolding of table sections, a hydraulic or 'soft-close' adapter or hinge may be provided in place of the conventional hinge depicted in the figures.

Significantly, as shown in FIG. 8, care should be taken so that the length of each of table sections 22 are not too long, whereby the door(s) of the washing machine and/or dryer may prevent table sections 22 from falling flat. Furthermore, each of table sections 22 must also be of sufficient length to that each extends laterally at least across a majority of the openings of a typical side loader washing machine and dryer, and most preferably span at least 75% of each of the washing machine and dryer openings. The greater the span of the conduit (from left to right), the lower the likelihood that laundry removed from a washing machine will fall to the ground prior to placement in the dryer. By the same token, transfer conduit 16 should be vertically positioned such that the openings of each of the washing machine and dryer are more than 50% accessible and preferably more than 75% accessible. In that regard it is most preferably for conduit 16 to be positioned low enough along the height of the openings of the washing machine and dryer so as not to interfere with the laundry transfer process. When utilizing a vertically suspended apparatus 10, the height of the conduit 16 is consistently positioned. This allows apparatus to be utilized regardless of whether or not a pedestal drawer is used for both the washing machine and dryer.

Figure 5:
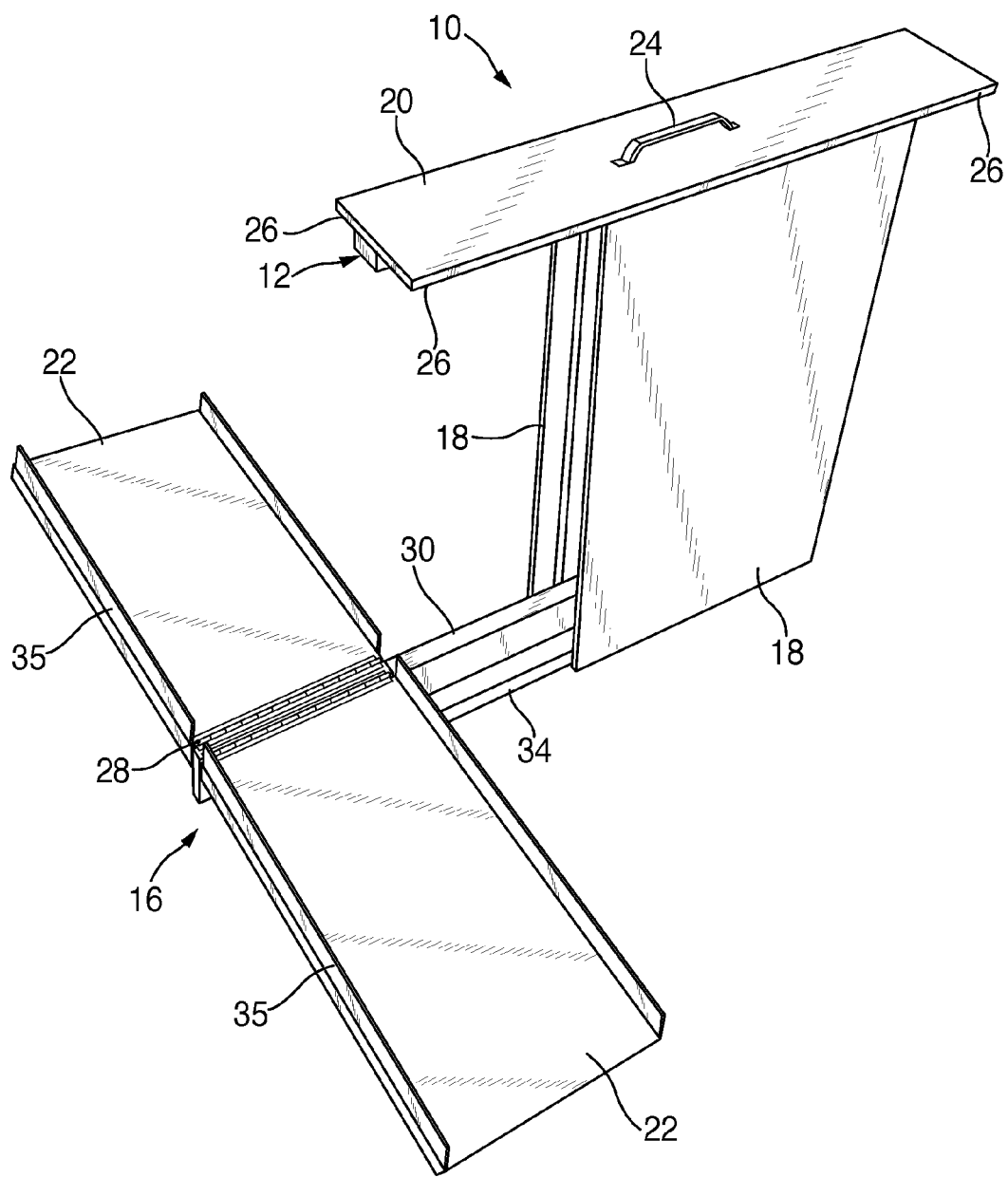
FIG. 5 is a perspective view of a second alternate embodiment of the laundry transfer apparatus with perimeter walls incorporated onto the conduit.

Each table section 22 comprises a width dimension that is preferably in the range of 8 to 16 inches so as to be able to accommodate a complete single load, both during the laundry transfer process as well as to accommodate a complete load of folded laundry after the drying cycle is complete. To help prevent clothing from falling to the floor during the laundry transfer process, perimeter walls 35 may optionally be incorporated at the edges of the table sections 22 of conduit 16, as depicted in FIG. 5. Preferably, perimeter walls 35 are flexible and composed of soft rubber-like material. This feature enables table sections 22 to fold upward without interfering with one another when conduit 16 is retracted and with causing damage to the perimeter walls 35 that come into contact with one another.

During use, apparatus 10 must be positioned sufficiently forward relative to the face or front edge of a washing machine and dryer such that when table sections 22 pivot downward, they do not hit the sides of the washing machine and dryer, and thereby fall just beyond and at the door or mouth of an open side loading washing machine and side loading dryer. As depicted in FIG. 6, FIG. 7 and FIG. 8, table sections 22 are fitted with mechanically folding support legs 36 positioned at the edges of table sections 22. Mechanically folding support legs 36 fold downward and are of sufficient length to reach the floor to support transfer conduit 16 when apparatus 10 is in use for transfer of clothing between washing machine and dryer. When apparatus 10 is not in use, folding support legs 36 remain folded against table sections 22 so that conduit 16 can clear partitions 18 and slide interior of casing 14.

It should further be understood that a transfer conduit may be provided in sliding engagement with a base and then placed and/or secured between a washing machine and dryer so that the transfer conduit may later be extended out from between the washing machine and dryer and then unfolded for use of its table section(s). After use, the table sections are folded back and retracted between washing machine and dryer. In this regard, it should be appreciated that the frame and/or casing depicted in the figures is/are not always required to practice the present invention. Likewise other features (e.g., as the perimeter walls, extension surfaces, support legs) remain optional additions. With an embodiment that does not include a frame or casing, additional weight may have to be provided to stabilize the device so that it does not tip when the transfer conduit is extended out from between the washing machine and dryer. Likewise, if the device (e.g., as at the partition walls or base) is sufficiently pressed between (or under) the washing machine and dryer, that may properly serve as a sufficient means to stabilize the device as well.

Figure 3:
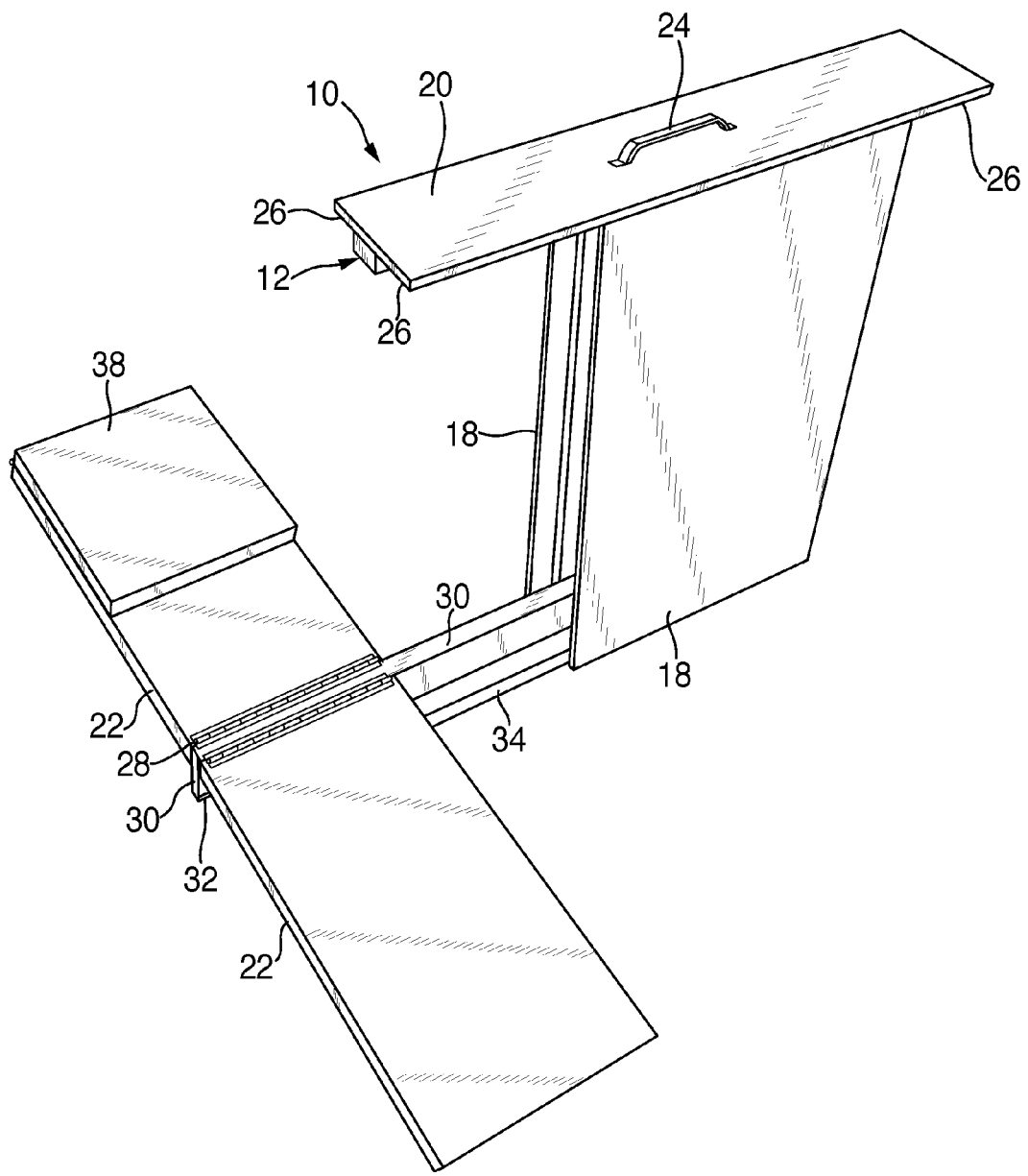
FIG. 3 is a perspective view of a first alternate embodiment of the laundry transfer apparatus with an extension section integrated into the conduit in a folded or closed position.
Figure 4:
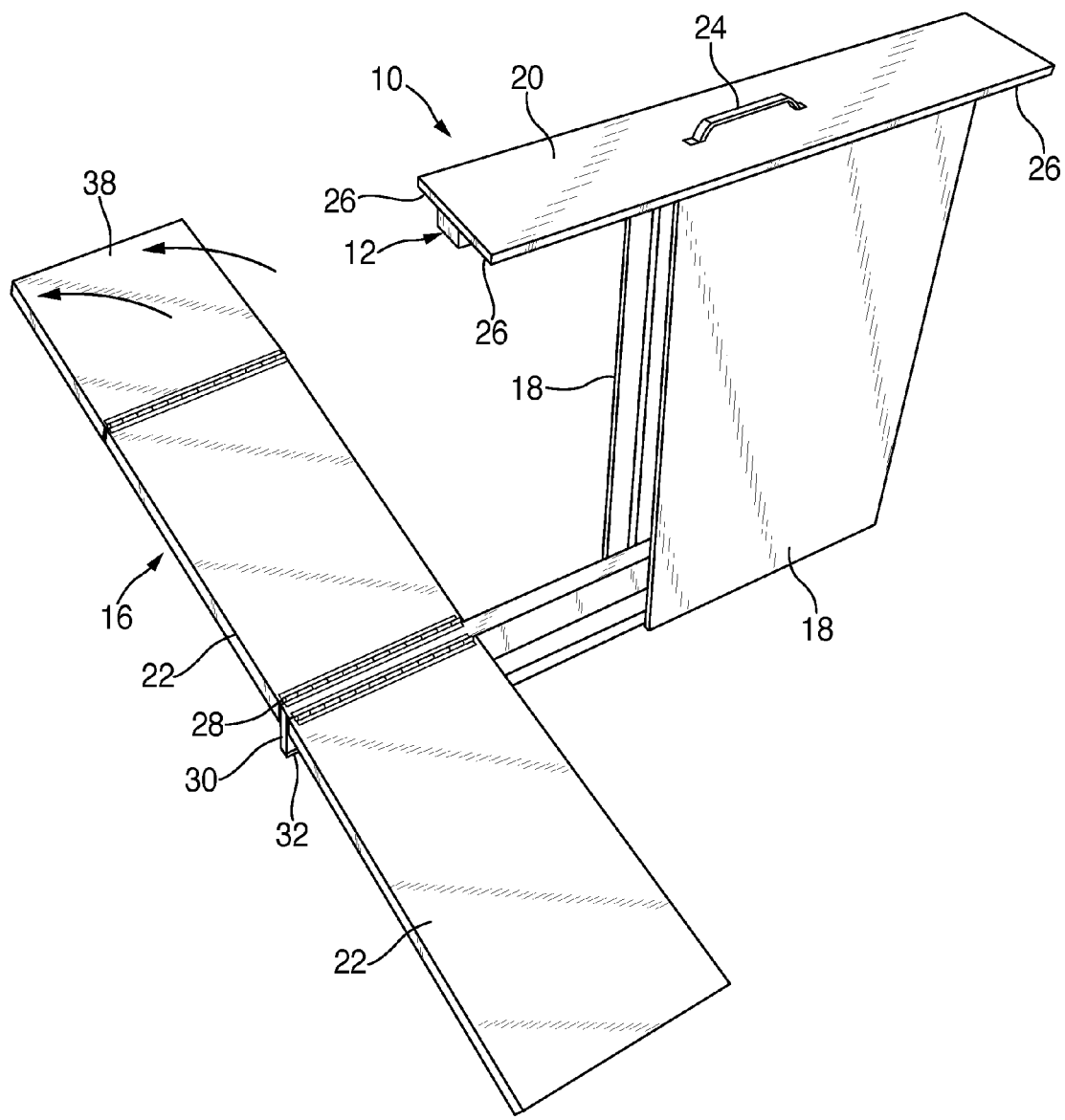
FIG. 4 is a perspective of the first alternate embodiment of the laundry transfer apparatus shown in FIG. 3 with the extension section in an unfolded or open position.
Figure 9:
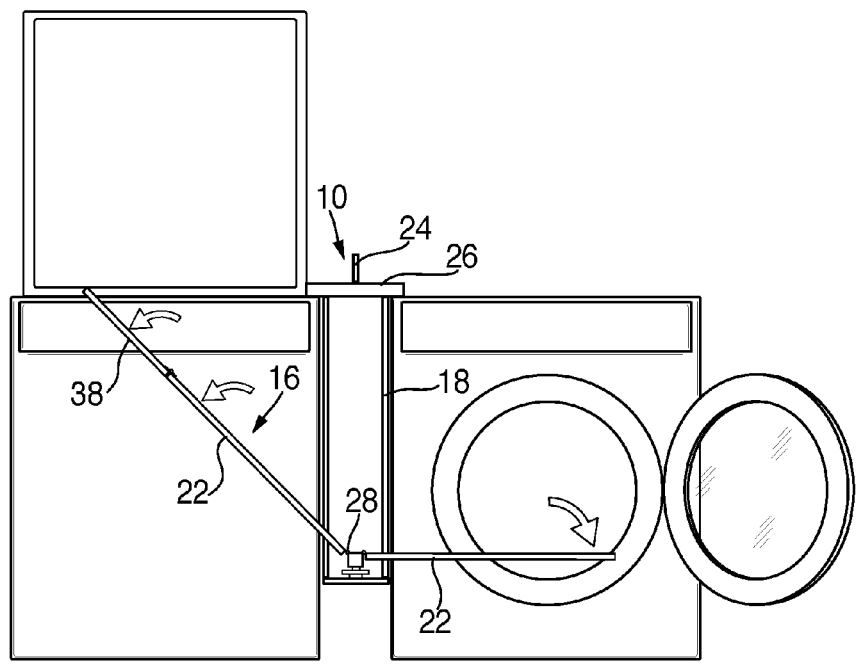
FIG. 9 is a front elevational view of the first alternate preferred embodiment of the laundry transfer apparatus in a fully extended position.
Figure 10:
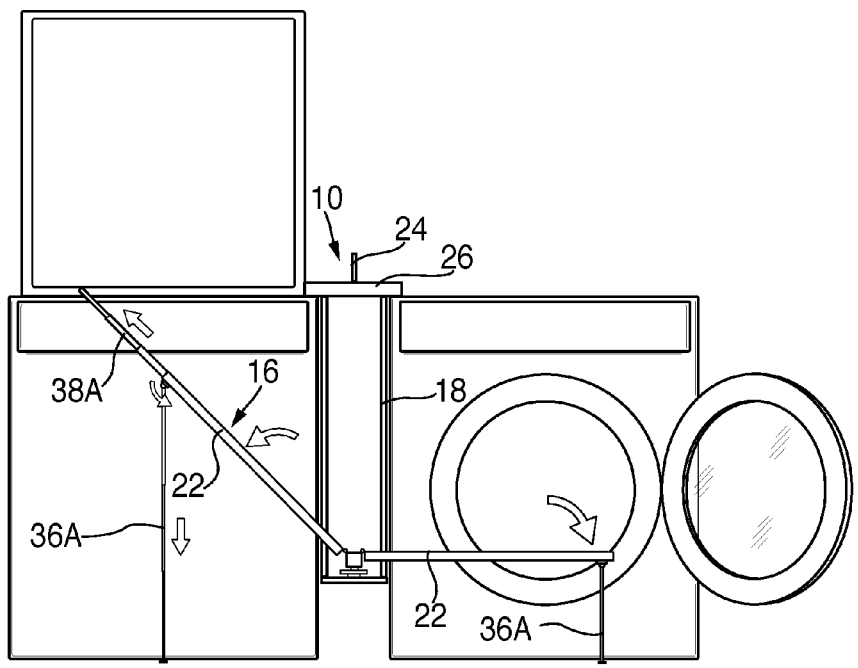
FIG. 10 is a front elevational view of a second alternate embodiment of the laundry transfer apparatus in a fully extended position, with a telescoping conduit section and telescoping legs.

With reference to FIG. 3, FIG. 4 and FIG. 9, there is shown another preferred embodiment of the laundry transfer apparatus 10. The primary distinction of this apparatus 10 is the addition of an extension surface 38 which enables apparatus 10 to be utilized with a top loading washing machine. In this embodiment, with the aid of extension surface 38, transfer conduit 16 spans a larger distance to reach the opening of a top loader washing machine, which is positioned on the upper surface of a washing machine, as shown in FIG. 9. While typically fully horizontally oriented, when utilizing a conduit 16 with an extension surface 38, said conduit is slanted enabling laundry to slide down from the opening of the washing machine. Likewise, with reference to FIG. 10, there is shown a further preferred embodiment of the laundry transfer apparatus 10, with an internally retractable, telescoping extension surface 38A. In this embodiment, telescoping, ball jointed support legs 36A are provided in place of folding support legs 36. Although FIG. 9 and FIG. 10 depict an extension surfaces 38, 38A that appear on the left side of the transfer conduit 16, it should be understood that extension surfaces 38, 38A may be provided on either side (or both sides) of transfer conduit 16.

With reference to FIGS. 11 through 16 there is shown a third alternate preferred embodiment of a laundry transfer apparatus 110. As shown most clearly in FIGS. 11 through 14, apparatus 110 comprises a generally rigid and reinforced wire frame 112 that forms an exterior casing 114 within which a transfer bridge, shelf, table or conduit 116 is located when in a closed and retracted position. Casing 114 comprises substantially open lateral walls or partitions 118 defined by wire frame 112, a base 119 an open top 120 and back 121. Cut ends of wire frame 112 are preferably capped with a cap 122. Partitions 118 are predominantly exposed and formed of a metallic material (and optionally coated in with plastic) that enables easy access and cleaning when necessary.

Figure 15:
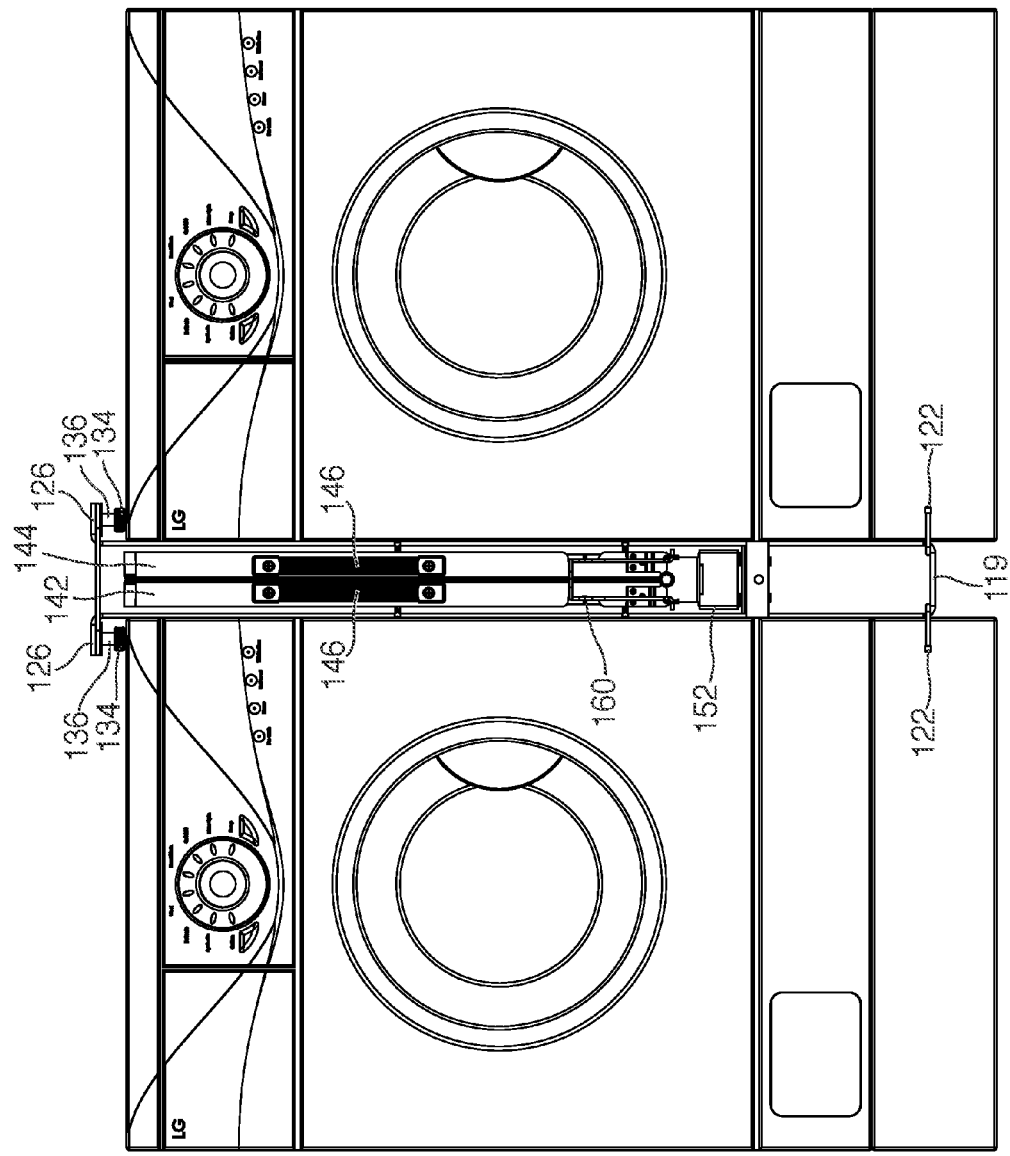
FIG. 15 is a front elevational view thereof vertically suspended between a side loader washing machine and dryer and in a closed or retracted position.
Figure 16:
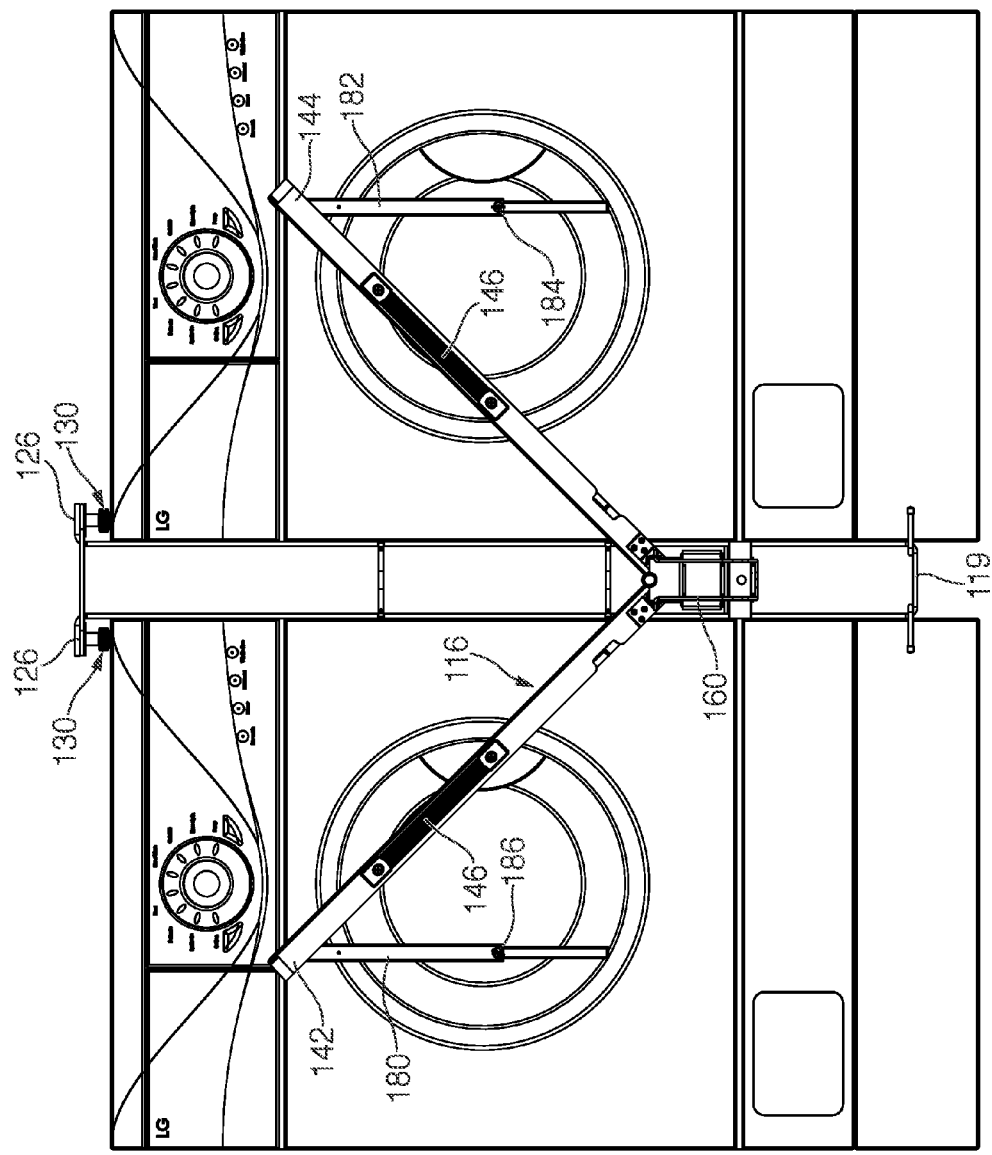
FIG. 16 is a front elevational view thereof vertically suspended between a side loader washing machine and dryer with the sliding support member, spine or sliding assembly in an extended position and the conduit, table or shelf assembly in a partially open position.

At base 119 are capped feet on either side of the base 119 which, as shown in FIG. 15 serve as a guide where to rest apparatus 110 during use. Preferably, capped feet rest against the washing machine and dryer. Although top 120 is shown in an open and exposed configuration, it should be appreciated and understood that additional wire framing may be applied transversely across ledges 126, 126, and a handle may be applied to those transverse wire sections in order to carry apparatus 110.

In a preferred embodiment, casing 114 comprises a pair of upper extensions, support wings or support ledges 126 that rest upon the top surfaces of a washing machine and dryer positioned on either side of apparatus 110. Support wings 126 are positioned on each side of open top 120. Support wings 126 thus extend laterally beyond partitions 118 and enable partitions 118 to serve as a boundary guard to prevent contact with the interior of casing 114 and transfer conduit 116. Support wings 126 vertically suspend apparatus 110 at an ideal height enabling conduit 116 to extend into an open, unfolded position at the mouth of a side loading washing machine and side loading dryer. Although support wings 126 are shown in a preferred embodiment to be integrally formed from said wire frame 112 and partitions 118, it should be appreciated and understood that they may be incorporated and attached as part of apparatus 110, but separate from partitions 118. For example, one or more support wings may be appended from a solid section of metal, wood or other material at open top 120 of wire frame 112 or at a given height along partition 118 to vertically suspend apparatus 110.

As shown in FIGS. 11 through 16, support wings 126 comprise bumpers 130 that enable apparatus 110 to rest atop a washing machine and dryer without support wings 126 of wire frame 112 coming into direct contact with the top of the washing machine and dryer, as shown in FIG. 15. Each bumper 130 comprises a friction pad 132, a knob 134 and a standoff 136. Friction pad 132 makes direct contact with the top surfaces of the washing machine and dryer.

Partitions 118 are positioned on either side of the exterior casing 114 and are intended to separate transfer conduit 116 from the sides of the washing machine and dryer between which apparatus 110 is positioned. Partitions 118 also facilitate the conduit 116 so that it may remain in an upwardly folded and closed position when apparatus 110 is not in use. It should be appreciated that wire frame 112 that forms partitions 118 are not required to extend fully forward to define an edge as shown in FIG. 11, and thus, conduit 116 may at least partially extend forward beyond the edge of partitions 118, even when conduit 116 is in a fully retracted position.

Transfer conduit 116 is comprised of a shelf assembly 140 of individual, substantially planar table sections 142, 144 that are each attached to sliding assembly 150. Sliding assembly 150 is composed of a first spine, or shelf support weldment 152 to which planar table sections 242, 244 are attached thereto via rivets or other means for connection that are known to those of ordinary skill in the art. Shelf support weldment 152 is slidably engaged to a drawer slide assembly 154, 156 and slide support weldment 158 of sliding assembly 150 that are shown in various extended and retracted positions in FIGS. 11 through 14. Use of multiple sliding railing extensions allow these parts to cooperatively bear the weight and force exerted by the extended transfer conduit 116 (with and without clothing). It should be appreciated and understood that other conventional sliding rails and similar means for slidably extending and retracting the shelf assembly 140 from inside casing 114 may be utilized while still keeping within the spirit and scope of the invention.

Figure 11:
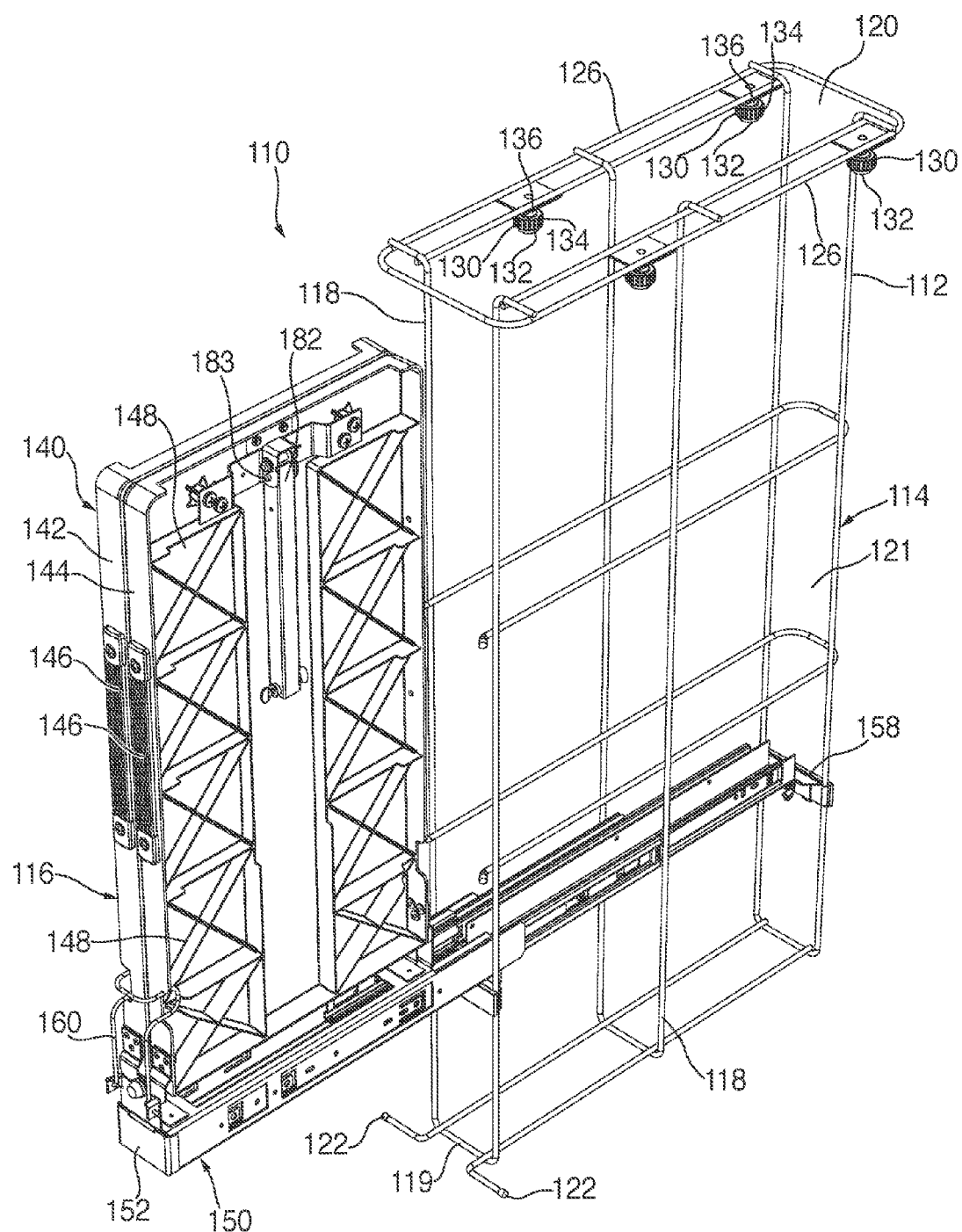
FIG. 11 is a perspective view of a third alternate preferred embodiment of the laundry transfer apparatus of the present invention, with the sliding support member or sliding assembly in an extended position and the conduit or shelf assembly in a closed position.
Figure 12:
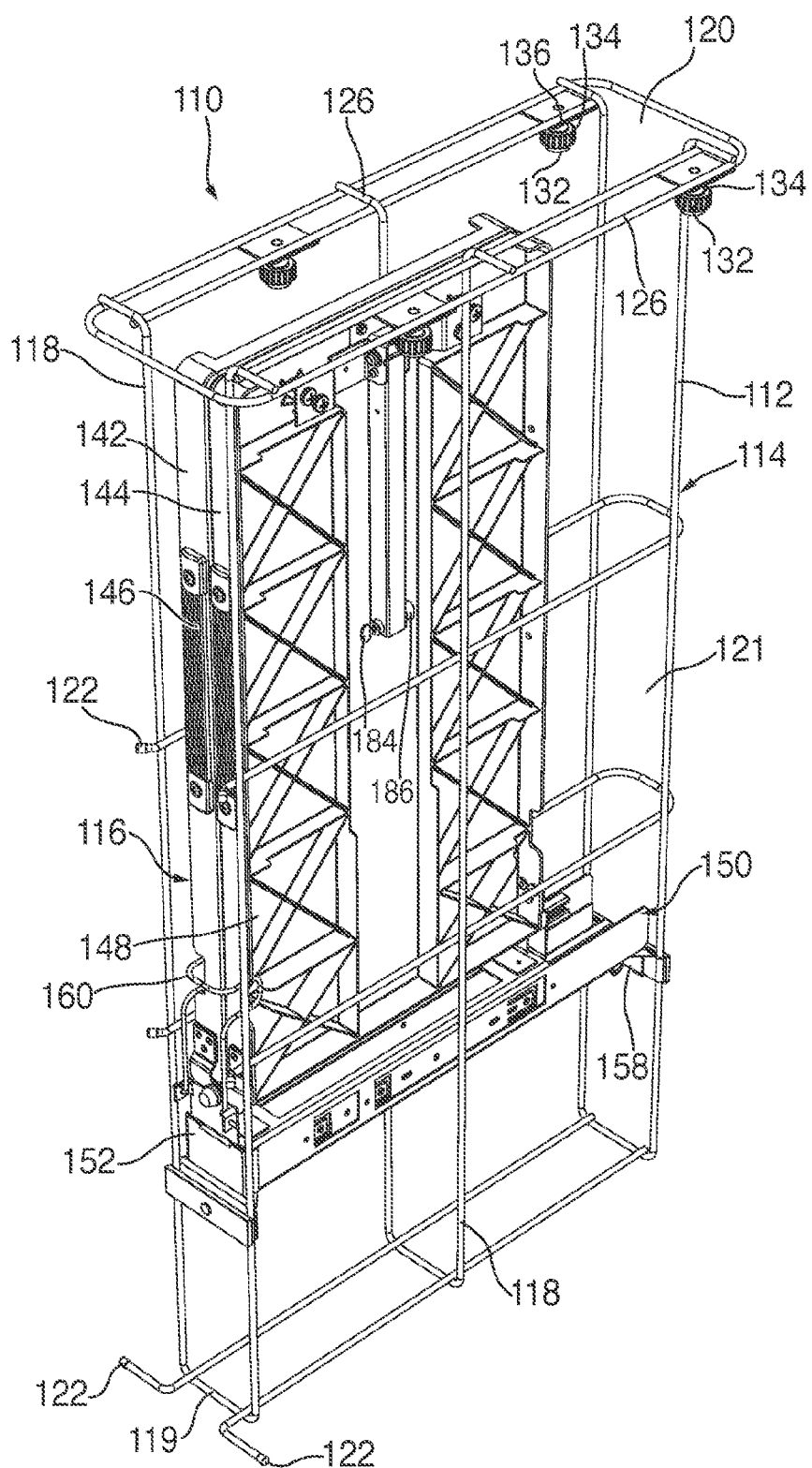
FIG. 12 is a perspective view thereof with the sliding support member or sliding assembly in a retracted position and the conduit or shelf assembly in a closed position.

As shown in FIG. 11 and FIG. 12, when apparatus 110 is in use, transfer conduit 116 is pulled from its retracted position, as shown in FIG. 12 into an extended position outside frame 112, as shown in FIG. 11, forward of the face of washing machine and dryer. Generally, conduit may be pulled utilizing handles 146. After transfer conduit 116 extends forward, table sections 142, 144 of shelf assembly 140 pivot down and outward from their upright folded positions. When transitioning from a retracted position to an extended position, shelf assembly 140 is held in place by a bale lock 160. Alternatively, a latch and chain may be provided to prevent table sections 142, 144 from falling outward automatically and away from one another once they clear the front of the washing machine and dryer. As shown in FIG. 11 and FIG. 12, table sections 142, 144 comprise reinforced X-sections 148 that provide structural support and reinforcement to table sections 142, 144.

Preferably, apparatus 110 is constructed such that when shelf assembly 140 is in an open position for use, table sections 142, 144 are positioned below the openings of the side loader appliances with which apparatus 110 is being used. In that regard, there is limited or no concern of interference by table sections 142, 144 with the door(s) of the washing machine and/or dryer when they swing open. In particular, when table sections 142, 144 are in an open position and rest below the openings of the washing machine and dryer, the doors of the appliances may swing open and closed freely and unencumbered. Likewise, the table sections 142, 144 can be constructed with an increased length dimension since they do not interfere with the opening operation of each of the doors of the washing machine and dryer. By incorporating a lengthier table (and preferably at least across 100% of the openings of the side loader appliances) there is more surface area and hence a lower likelihood and concern for laundry dropping to the ground during transfer.

In instances where table sections 142, 144 cannot rest below the door openings of the side loader appliances with which apparatus 110 is being used, transfer conduit 116 should be vertically positioned such that the openings of each of the washing machine and dryer are more than 50% accessible and preferably more than 75% accessible. In that regard it is preferable for conduit 116 to be constructed and positioned low enough along the height of the openings of the washing machine and dryer so as interfere least with the laundry transfer process.

Figure 13:
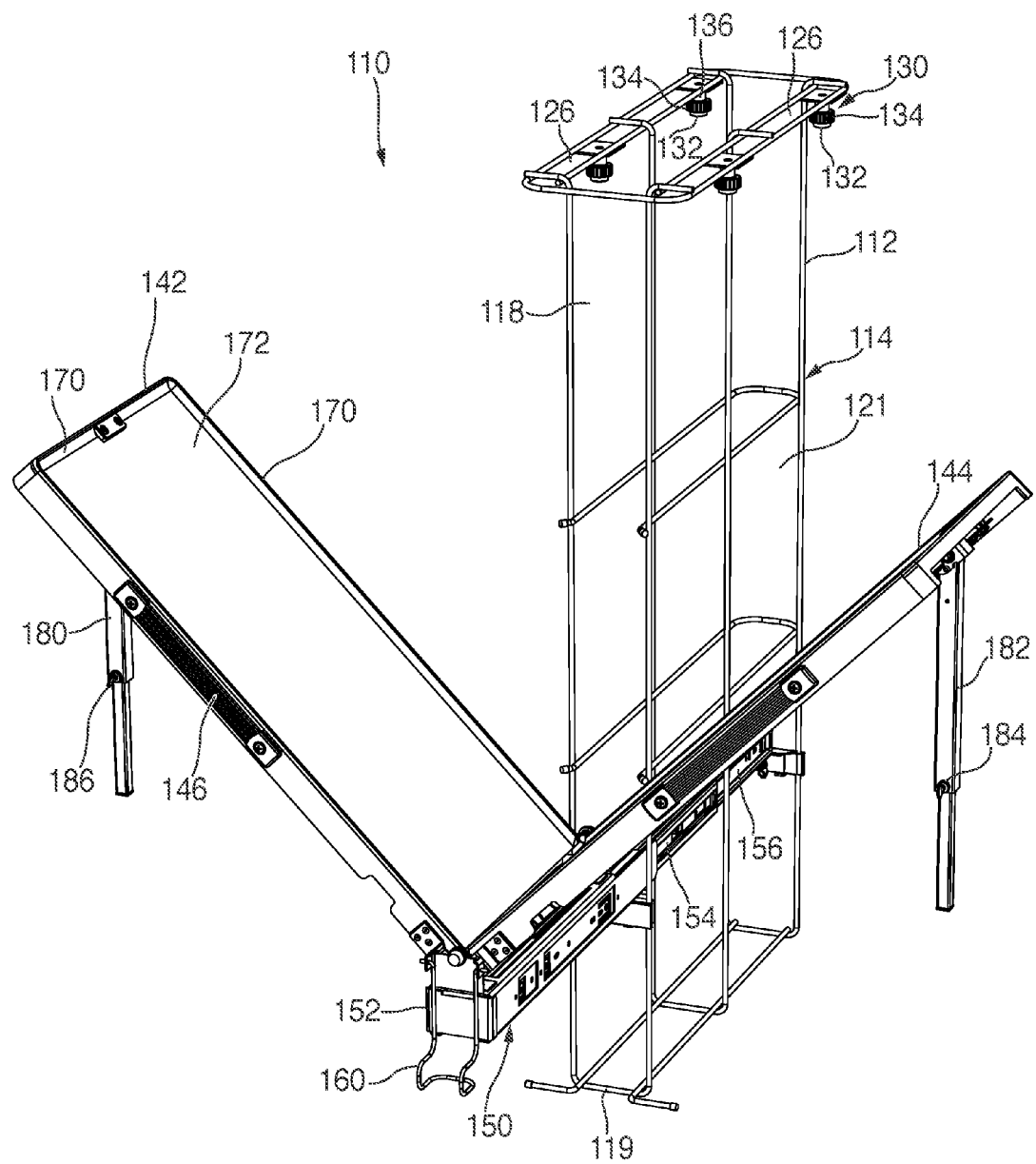
FIG. 13 is a perspective view thereof with the sliding support member or sliding assembly in an extended position and the conduit or shelf assembly in a partially open position.
Figure 14:
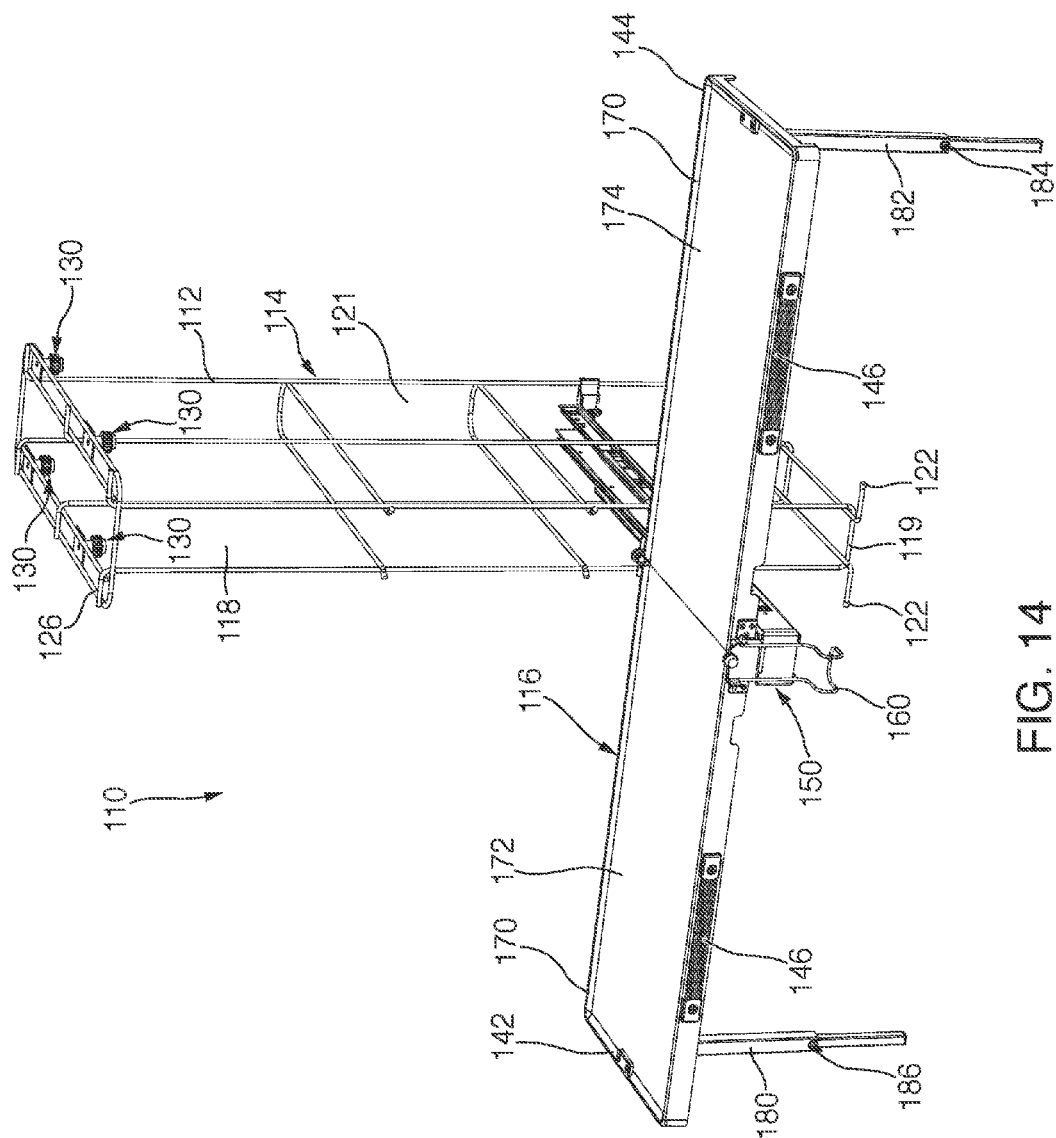
FIG. 14 is a perspective view thereof with the sliding support member or sliding assembly in an extended position and the conduit or shelf assembly in a fully open position, with folding support legs extended and supporting the shelf assembly.

Each table section 142, 144 of shelf assembly 140 comprises a width dimension that is preferably in the range of 8 to 16 inches so as to be able to accommodate a complete single load, both during the laundry transfer process as well as to accommodate a complete load of folded laundry after the drying cycle is complete. To help prevent clothing from falling to the floor during the laundry transfer process, perimeter walls 170 are optionally incorporated at all external edges of the table sections 142, 144 of conduit 116, as depicted in FIG. 13 and FIG. 14, creating a single walled-in surface area. Preferably, perimeter walls 170 are integrally molded with shelf assembly 140, creating depressed surface 172, 174 in each of table sections 142, 144, respectively.

During use, apparatus 110 must be positioned sufficiently forward relative to the face or front edge of a washing machine and dryer such that when table sections 142, 144 pivot downward, they do not hit the sides of the washing machine and dryer, and thereby fall just beyond and at the door or mouth of an open side loading washing machine and side loading dryer. As depicted in FIGS. 11 through 14, table sections 142, 144 are fitted with mechanically folding support legs 180, 182 positioned at the edges of table sections 142, 144. Mechanically folding support legs 180, 182 fold downward and are of sufficient length to reach the floor to support transfer conduit 116 when apparatus 110 is in use for transfer of clothing between washing machine and dryer. When apparatus 110 is not in use, folding support legs 180, 182 remain folded against table sections 142, 144 so that conduit 116 can clear partitions 118 and slide interior of casing 114.

Folding support legs 180, 182 are each attached to table sections 142, 144 via a leg bracket assembly 184 that is secured to table sections 142, 144. A dowel pin (not shown) is inserted through each of folding support legs 180, 182 where they fold up against table sections 142, 144 for storage, and fold down during use of apparatus 110. A spring lock 183 is also provided to keep the folding support legs 180, 182 in place until ready for use. Each of the support legs 180, 182 are fitted with a pair of spade head thumb screws 184, 186 that controls and enables a single level of extension of each of the support legs 180, 182. Thus, where only a single level of extension is required, as shown in FIG. 13 and FIG. 14, only a single thumb screw need be adjusted to enable the extension of support legs 180, 182.

With reference to FIGS. 17 through 24, there is shown another preferred embodiment of a laundry transfer apparatus 210. The primary distinction of this apparatus 200 is the addition of a folding extension surface 290 which enables apparatus 210 to be utilized with a top loading washing machine. In this embodiment, with the aid of extension surface 290, transfer conduit 216 spans a larger distance to reach the opening of a top loader washing machine, which is positioned on the upper surface of a washing machine, as shown in FIG. 24. While typically fully horizontally oriented, when utilizing a conduit 216 with an extension surface 290, said conduit is slanted enabling laundry to slide down from the opening of the washing machine. Although FIG. 20, for example, depicts an extension surface 290 that appears on the left side of the transfer conduit 216, it should be understood that an extension surface may be provided on either side (or both sides) of transfer conduit 216.

Aside from the foregoing distinctions, the construction of apparatus 210 is substantially similar to apparatus 110. In particular, with reference to FIGS. 17 through 24 there is shown a fourth alternate preferred embodiment of a laundry transfer apparatus 210. As shown most clearly in FIGS. 17 through 21, apparatus 210 comprises a generally rigid and reinforced wire frame 212 that forms an exterior casing 214 within which a transfer bridge, shelf, table or conduit 216 is located when in a closed and retracted position. Casing 214 comprises substantially open lateral walls or partitions 218 defined by wire frame 212, a base 219 an open top 220 and back 221. Cut ends of wire frame 212 are preferably capped with a cap 222. Partitions 218 are predominantly exposed and formed of a metallic material (and optionally coated in with plastic) that enables easy access and cleaning when necessary.

Figure 22:
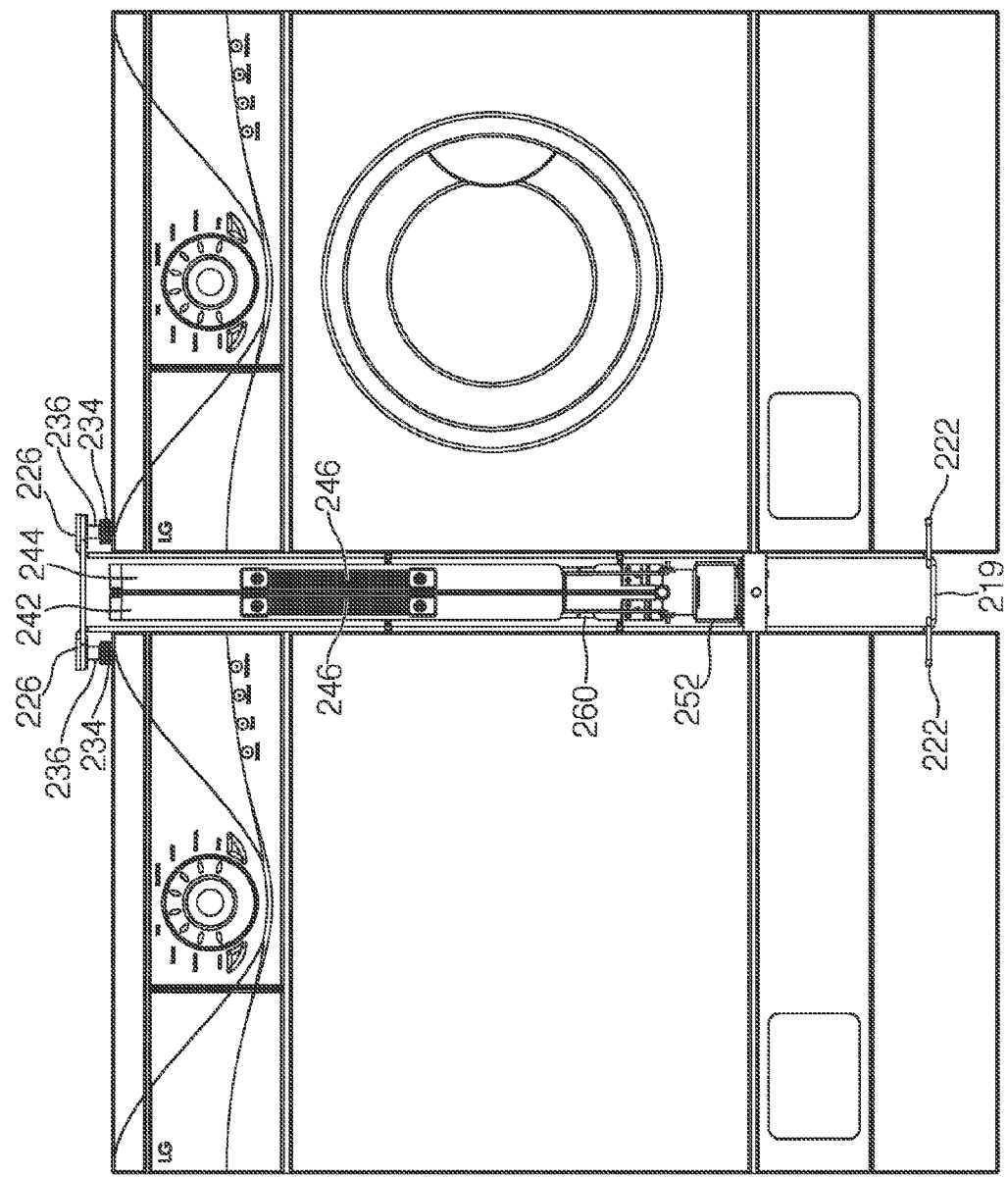
FIG. 22 is a front elevational view thereof vertically suspended between a top loader washing machine and a side loader dryer and in a closed or retracted position.

At base 219 are capped feet on either side of the base 219 which, as shown in FIG. 22 serve as a guide where to rest apparatus 210 during use. Preferably, capped feet rest against the washing machine and dryer. Although top 220 is shown in an open and exposed configuration, it should be appreciated and understood that additional wire framing may be applied transversely across ledges 226, 226, and a handle may be applied to those transverse wire sections in order to carry apparatus 210.

In a preferred embodiment, casing 214 comprises a pair of upper extensions, support wings or support ledges 226 that rest upon the top surfaces of a washing machine and dryer positioned on either side of apparatus 210. Support wings 226 are positioned on each side of open top 220. Support wings 226 thus extend laterally beyond partitions 218 and enable partitions 218 to serve as a boundary guard to prevent contact with the interior of casing 214 and transfer conduit 216. Support wings 226 vertically suspend apparatus 210 at an ideal height enabling conduit 216 to extend into an open, unfolded position at the mouth of a side loading washing machine and side loading dryer. Although support wings 226 are shown in a preferred embodiment to be integrally formed from said wire frame 212 and partitions 218, it should be appreciated and understood that they may be incorporated and attached as part of apparatus 210, but separate from partitions 218. For example, one or more support wings may be appended from a solid section of metal, wood or other material at open top 220 of wire frame 212 or at a given height along partition 218 to vertically suspend apparatus 210.

As shown in FIGS. 17 through 24, support wings 226 comprise bumpers 230 that enable apparatus 210 to rest atop a washing machine and dryer without support wings 226 of wire frame 212 coming into direct contact with the top of the washing machine and dryer, as shown in FIG. 22. Each bumper 230 comprises a friction pad 232, a knob 234 and a standoff 236. Friction pad 232 makes direct contact with the top surfaces of the washing machine and dryer.

Partitions 218 are positioned on either side of the exterior casing 214 and are intended to separate transfer conduit 216 from the sides of the washing machine and dryer between which apparatus 210 is positioned. Partitions 218 also facilitate the conduit 216 so that it may remain in an upwardly folded and closed position when apparatus 210 is not in use. It should be appreciated that wire frame 212 that forms partitions 218 are not required to extend fully forward to define an edge as shown in FIG. 17, and thus, conduit 216 may at least partially extend forward beyond the edge of partitions 218, even when conduit 216 is in a fully retracted position.

Transfer conduit 216 is comprised of a shelf assembly 240 of individual, substantially planar table sections 242, 244 that are each attached to sliding assembly 250. Sliding assembly 250 is composed of a first spine, or shelf support weldment 252 to which planar table sections 242, 244 are attached thereto via rivets or other means for connection that are known to those of ordinary skill in the art. Shelf support weldment 252 is slidably engaged to a drawer slide assembly 254, 256 and slide support weldment 258 of sliding assembly 250 that are shown in various extended and retracted positions in FIGS. 17 through 21. Use of multiple sliding railing extensions allow these parts to cooperatively bear the weight and force exerted by the extended transfer conduit 216 (with and without clothing). It should be appreciated and understood that other conventional means for slidably extending and retracting the shelf assembly 240 from inside casing 214 may be utilized while still keeping within the spirit and scope of the invention.

Figure 17:
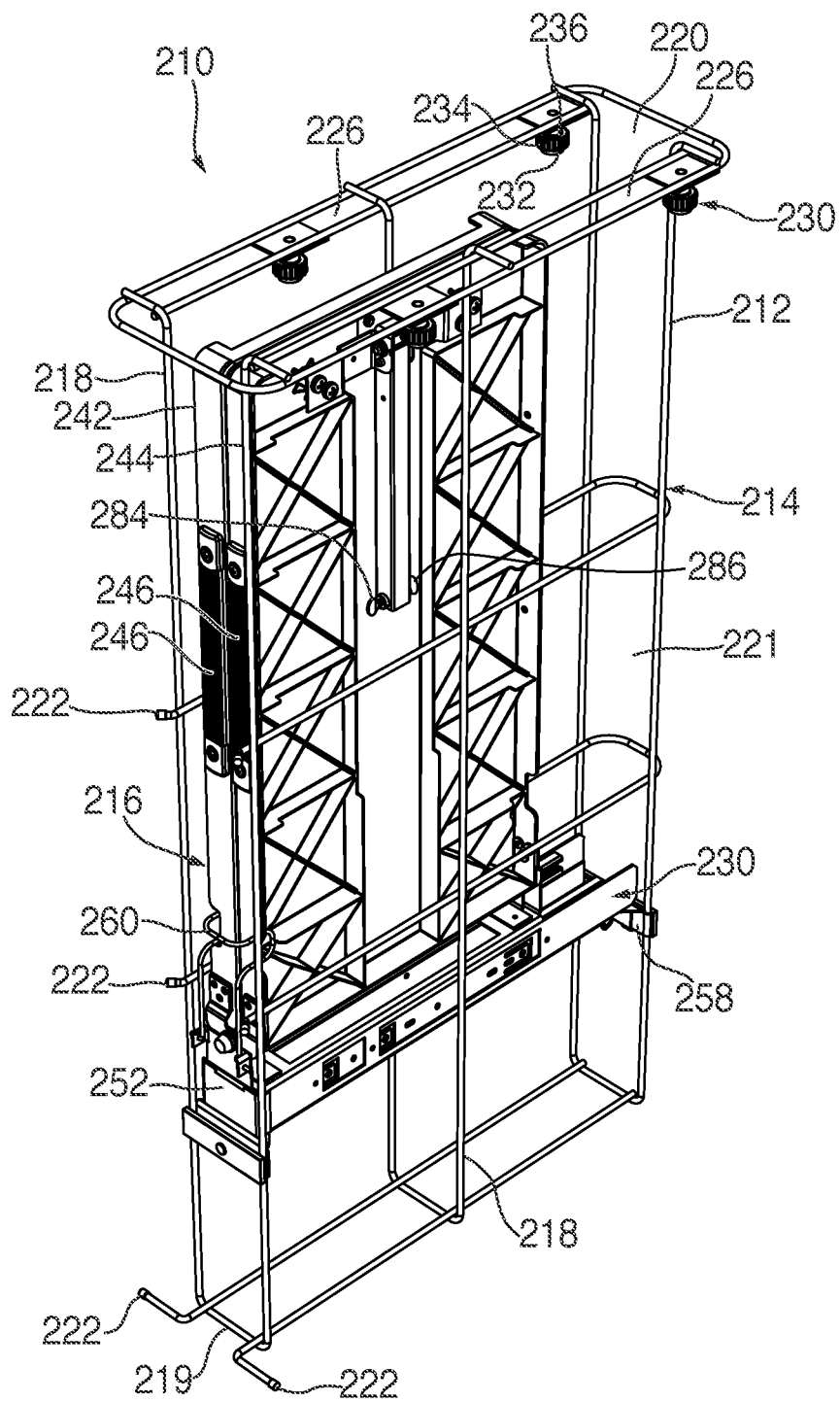
FIG. 17 is a perspective view of a fourth alternate preferred embodiment of the laundry transfer apparatus of the present invention with the sliding support member or sliding assembly in a retracted position and the conduit or shelf assembly in a closed position.
Figure 18:
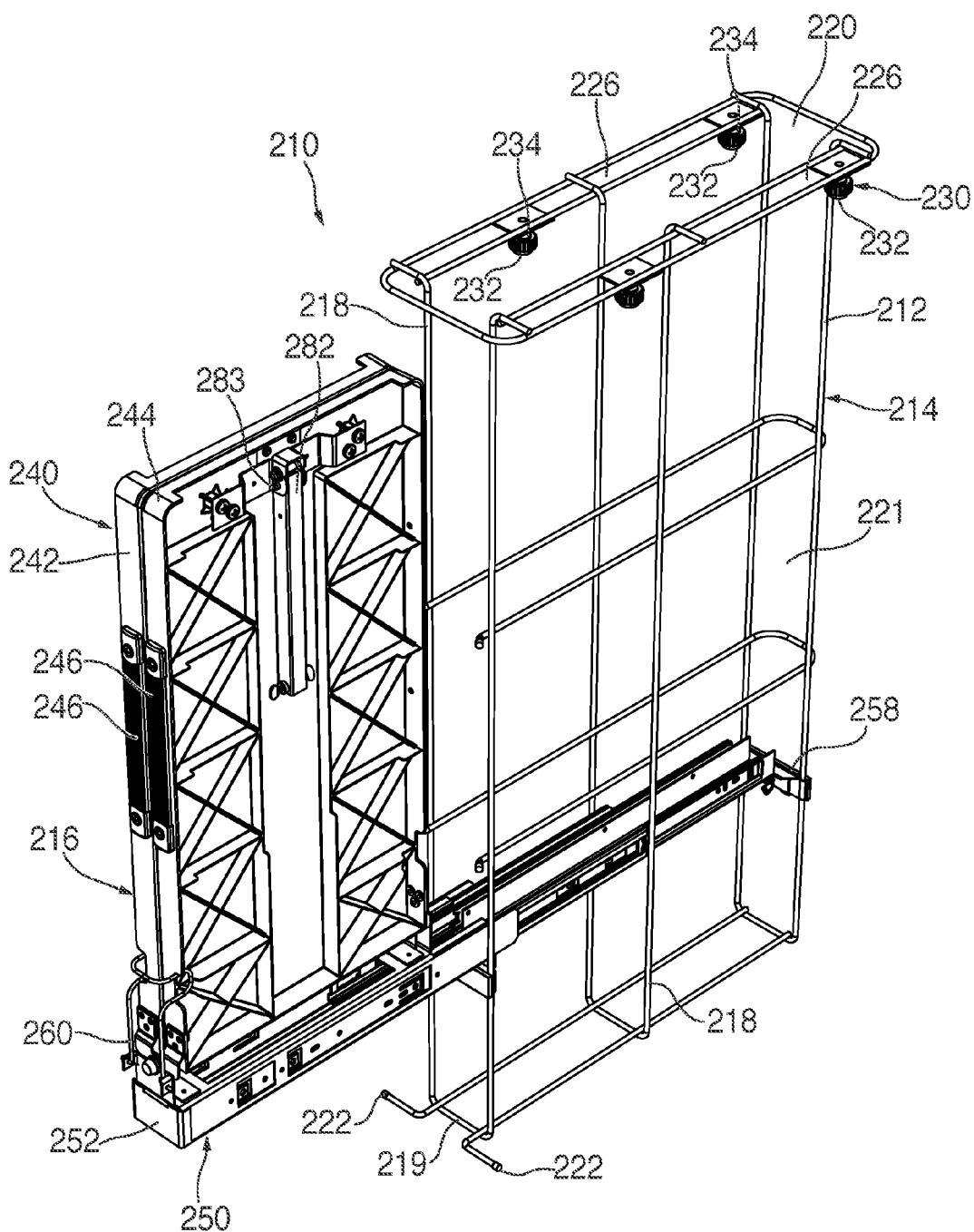
FIG. 18 is a perspective view thereof with the sliding support member or sliding assembly in an extended position and the conduit or shelf assembly in a closed position.

As shown in FIG. 17 and FIG. 18, when apparatus 210 is in use, transfer conduit 216 is pulled from its retracted position, as shown in FIG. 17 into an extended position outside frame 212, as shown in FIG. 18, forward of the face of washing machine and dryer as shown in FIG. 23. After transfer conduit 216 extends forward, table sections 242, 244 of shelf assembly 240 pivot down and outward from their upright folded positions. When transitioning from a retracted position to an extended position, shelf assembly 240 is held in place by a bale lock 260. Alternatively, a latch and chain may be provided to prevent table sections 242, 244 from falling outward automatically and away from one another once they clear the front of the washing machine and dryer.

As described above in connection with apparatus 110, apparatus 210 is constructed to help prevent interference with opening doors of appliances with which apparatus 210 is used, and the same structural features and preferences apply. In this regard however, there is limited concern since apparatus 210 is intended and constructed for use with a top loading washing machine.

Figure 19:
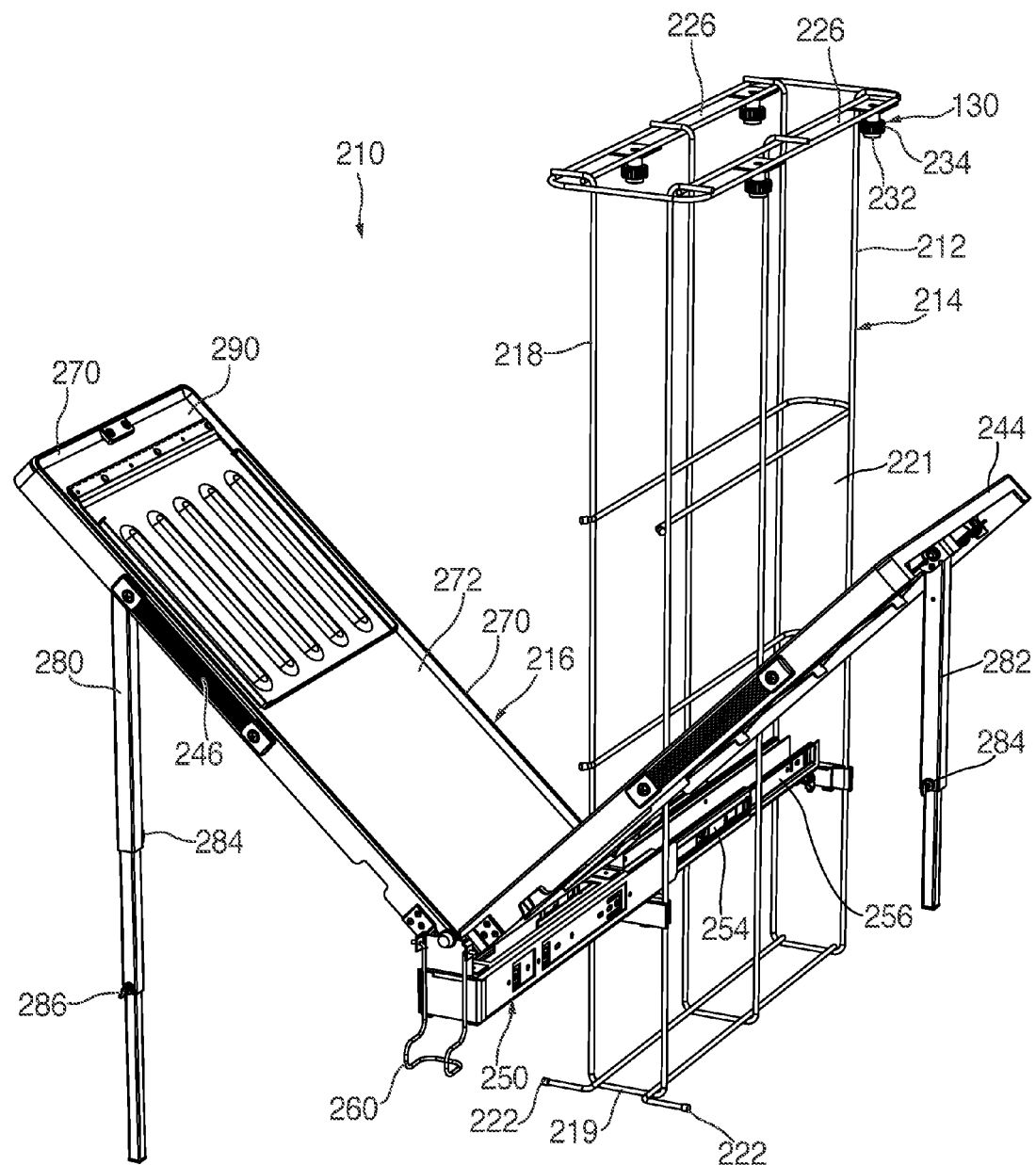
FIG. 19 is a perspective view thereof with the sliding support member or sliding assembly in an extended position and the conduit or shelf assembly in a partially open position and exposing a pivoting conduit extension or folding extension surface.
Figure 20:
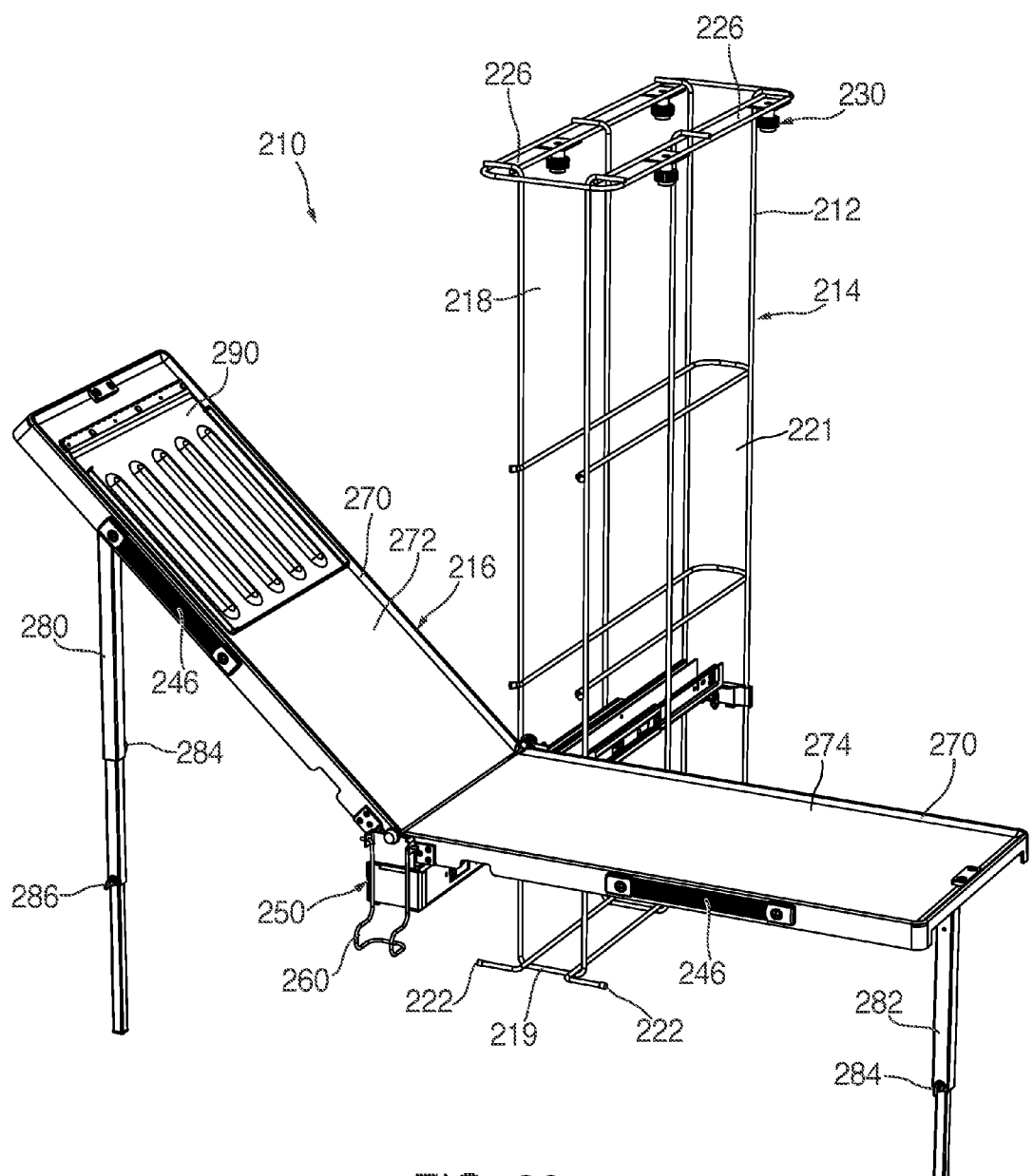
FIG. 20 is a perspective view thereof with the sliding support member or sliding assembly in an extended position and the conduit or shelf assembly in a fully open position and the pivoting conduit extension or folding extension surface in a folded position.
Figure 21:
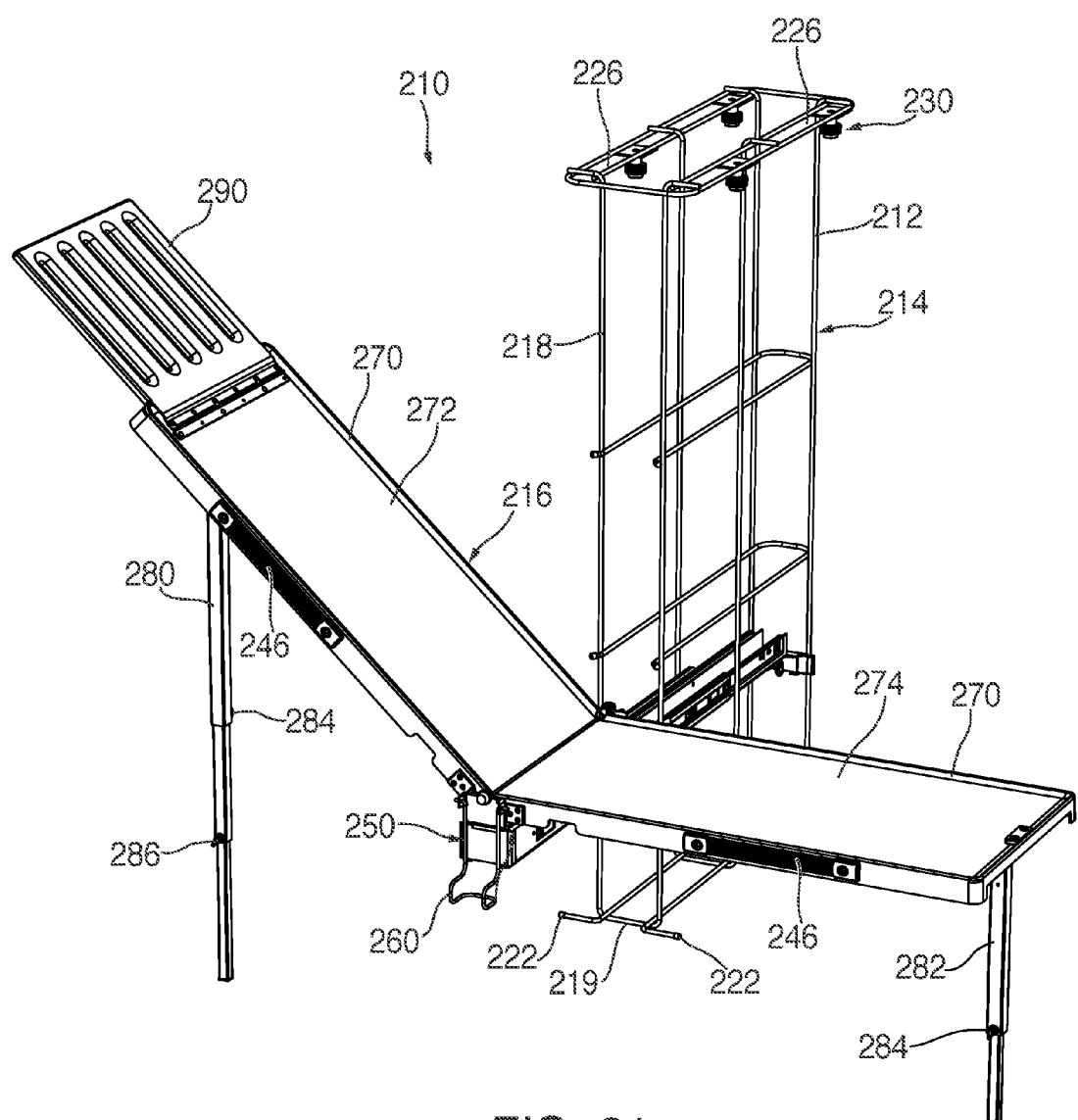
FIG. 21 is a perspective view thereof with the sliding support member or sliding assembly in an extended position and the conduit or shelf assembly in a fully open position and the pivoting conduit extension or folding extension surface in an unfolded position.

Each table section 242, 244 of shelf assembly 240 comprises a width dimension that is preferably in the range of 8 to 16 inches so as to be able to accommodate a complete single load, both during the laundry transfer process as well as to accommodate a complete load of folded laundry after the drying cycle is complete. To help prevent clothing from falling to the floor during the laundry transfer process, perimeter walls 270 are optionally incorporated at the edges of the table sections 242, 244, as depicted in FIG. 19 through 21. Preferably, perimeter walls 270 are integrally molded with shelf assembly 240, creating depressed surface 272, 274 in each of table sections 242, 244, respectively.

During use, apparatus 210 must be positioned sufficiently forward relative to the face or front edge of a washing machine and dryer such that when table sections 242, 244 pivot downward, they do not hit the sides of the washing machine and dryer, and thereby fall just beyond and at the door or mouth of an open side loading washing machine and side loading dryer. As depicted in FIGS. 17 through 21 and FIG. 23, table sections 242, 244 are fitted with mechanically folding support legs 280, 282 positioned at the edges of table sections 242, 244. Mechanically folding support legs 280, 282 fold downward and are of sufficient length to reach the floor to support transfer conduit 216 when apparatus 210 is in use for transfer of clothing between washing machine and dryer. When apparatus 210 is not in use, folding support legs 280, 282 remain folded against table sections 242, 244 so that conduit 216 can clear partitions 218 and slide interior of casing 214.

Folding support legs 280, 282 are each attached to table sections 242, 244 via a leg bracket assembly 284 that is secured to table sections 242, 244. A dowel pin (not shown) is inserted through each of folding support legs 280, 282 where they fold up against table sections 242, 244 for storage, and fold down during use of apparatus 210. A spring lock 283 is also provided to keep the folding support legs 280, 282 in place until ready for use. Each of the support legs 280, 282 are fitted with a pair of spade head thumb screws 284, 286 that controls and enables a single level of extension of each of the support legs 280, 282. Thus, where only a single level of extension is required, as on table section 244, as shown in FIG. 20, only a single thumb screw need be adjusted to enable the extension of support leg 282. However, where two levels of extension are required, as on table section 242, as shown in FIG. 20, both thumb screws are adjusted to enable the full double length extension of support leg 280. As shown in FIG. 21 and FIG. 24, extension surface folding 290 enables the use of apparatus 210 for top loader washers.

The accompanying drawings illustrate several preferred embodiments of a laundry transfer apparatus. However, other types and configurations are possible, and the drawings are not intended to be limiting in that regard. Thus, although the description above and accompanying drawings contains much specificity, the details provided should not be construed as limiting the scope of the embodiment(s) but merely as providing illustrations of some of the presently preferred embodiment(s). The drawings and the description are not to be taken as restrictive on the scope of the embodiment(s) and are understood as broad and general teachings in accordance with the present invention. While the present embodiment(s) of the invention have been described using specific terms, such description is for present illustrative purposes only, and it is to be understood that modifications and variations to such embodiments, including but not limited to the substitutions of equivalent features, materials, or parts, and the reversal of various features thereof, may be practiced by those of ordinary skill in the art without departing from the spirit and scope of the invention. It should also be noted that the terms "first," and "second," and similar terms may be used herein to modify various elements. These modifiers do not imply a spatial, sequential, or hierarchical order to the modified elements unless specifically stated.

The invention claimed is:

1. A laundry transfer apparatus for aid in the task of transferring laundry between a washing machine and dryer, comprising:
　　a frame forming an exterior wire casing;
　　an pair of supporting wings;
　　at least one bumper attached at each of said pair of supporting wings, said at least one bumper having a friction pad, a knob and a standoff to rest upon said washing machine and dryer;

a sliding assembly;

a shelf assembly engaged to said frame with said sliding assembly, said shelf assembly formed by a plurality of substantially planar surfaces;

wherein said plurality of substantially planar surfaces fold upward and inside said exterior wire casing when said shelf assembly is in a closed retracted position, and said plurality of substantially planar surfaces fold downward and outside said exterior wire casing when said shelf assembly is in an open extended position.

2. The laundry transfer apparatus of claim 1, further comprising a bale, said bale attached to said shelf assembly to maintain said plurality of substantially planar surfaces in a folded position.

3. The laundry transfer apparatus of claim 1, wherein said pair of supporting wings vertically suspend said exterior wire casing off the ground when said pair of supporting wings rest upon said washing machine and said dryer.

4. The laundry transfer apparatus of claim 1, wherein said shelf assembly includes a perimeter wall at each of said plurality of substantially planar surfaces.

5. The laundry transfer apparatus of claim 4, wherein said substantially planar surfaces form depressed surface sections.

6. The laundry transfer apparatus of claim 1, wherein said washing machine is a top loader washing machine with a top surface and said plurality of substantially planar surfaces includes an extending folding surface to reach said top surface of said top loader washing machine.

7. The laundry apparatus of claim 6, wherein said extending folding surface is hingedly attached to one of said plurality of substantially planar surfaces.

8. The laundry apparatus of claim 1, further comprising support legs attached to support the bottom of said plurality of substantially planar surfaces when said shelf assembly is in an extended and open position.

9. The laundry apparatus of claim 8, wherein said support legs are held in place against said shelf assembly by a spring lock when said shelf assembly is in a folded position.

10. The laundry apparatus of claim 1, wherein said sliding assembly includes a shelf support weldment, a drawer slide railing and a slide support weldment that cooperate with one another to enable said shelf assembly to slide between a retracted position inside said wire casing and an extended position exterior of said wire casing.

11. A laundry transfer apparatus, comprising:

a rigid frame;

a sliding assembly;

a shelf assembly retractably engaged to said frame with said sliding assembly, said shelf assembly formed from at least one depressed and substantially planar surface;

wherein said at least one depressed and substantially planar surface folds upward and inside said frame when said shelf assembly is in a closed retracted position, and said at least one depressed and substantially planar surface folds downward and outside said frame when said shelf assembly is in an open extended position.

12. The laundry transfer apparatus of claim 11, wherein said shelf assembly comprise a support leg to support said shelf assembly when said shelf assembly is in said open extended position.

13. The laundry transfer apparatus of claim 11, wherein said shelf assembly comprises a perimeter wall.

14. The laundry transfer apparatus of claim 11, wherein said shelf assembly comprises an extension folding surface.

15. The laundry transfer apparatus of claim 11, further comprising support wings to suspend said frame between a washing machine and a dryer.

16. A laundry transfer apparatus, comprising:

a wire frame;

a plurality of support wings for vertically suspending said wire frame between a washing machine and a dryer;

a sliding assembly;

a transfer shelf assembly connected to said frame with said sliding assembly, said transfer shelf assembly having at least one substantially planar table section with a perimeter wall;

wherein when said transfer shelf assembly is in an open position said at least one substantially planar table section is substantially horizontally oriented and when said transfer bridge is in a closed retracted position, said at least one substantially planar table section is substantially vertically oriented.

17. The laundry transfer apparatus of claim 16, said transfer shelf assembly comprising an extension surface of sufficient length to reach the opening of a top loading washing machine.

18. The laundry transfer apparatus of claim 16, further comprising support legs positioned beneath said transfer shelf assembly.

19. The laundry transfer apparatus of claim 18, wherein said support legs are telescopically adjustable.

20. The laundry transfer apparatus of claim 19, wherein said sliding assembly includes a shelf support weldment, a drawer slide railing and a slide support weldment that cooperate with one another to enable said shelf assembly to slide between a retracted position inside said wire frame and an extended position exterior of said wire frame.

* * * * *